(12) United States Patent
Hamilton et al.

(10) Patent No.: US 12,209,842 B2
(45) Date of Patent: *Jan. 28, 2025

(54) RIFLE SCOPE TURRET WITH TOOL-FREE ZEROING

(71) Applicant: SHELTERED WINGS, INC., Barneveld, WI (US)

(72) Inventors: David Hamilton, Barneveld, WI (US); Rob Morell, Barneveld, WI (US); Seth Toy, Barneveld, WI (US); Scott Parks, Barneveld, WI (US)

(73) Assignee: Sheltered Wings, Inc., Barneveld, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/734,831

(22) Filed: May 2, 2022

(65) Prior Publication Data

US 2023/0113722 A1    Apr. 13, 2023

Related U.S. Application Data

(63) Continuation of application No. 16/736,440, filed on Jan. 7, 2020, now Pat. No. 11,320,241.

(Continued)

(51) Int. Cl.
  *F41G 1/38*    (2006.01)
  *G02B 23/00*   (2006.01)
  *G02B 23/16*   (2006.01)

(52) U.S. Cl.
  CPC .............. *F41G 1/38* (2013.01); *G02B 23/00* (2013.01); *G02B 23/16* (2013.01)

(58) Field of Classification Search
  CPC ............ F41G 1/38; G02B 23/16; G02B 7/023

(Continued)

(56) References Cited

U.S. PATENT DOCUMENTS

| | | | | |
|---|---|---|---|---|
| 1,425,321 A | * | 8/1922 | Etherington | F41G 1/28 |
| | | | | 42/133 |
| 2,811,894 A | * | 11/1957 | Braker | F41G 1/38 |
| | | | | 356/21 |

(Continued)

FOREIGN PATENT DOCUMENTS

WO    2017132316 A1    8/2017

OTHER PUBLICATIONS

Extended European Search Report for European Patent Application No. 20738510.5 issued Aug. 19, 2022, 7 pages.

(Continued)

*Primary Examiner* — Joshua E Freeman
(74) *Attorney, Agent, or Firm* — Husch Blackwell LLP

(57) ABSTRACT

A viewing optic is disclosed. In one embodiment, the viewing optic is a rifle scope having a scope body, a movable optical element defining an optical axis connected to the scope body, a turret and a zero point adjustment subassembly. The turret includes a turret screw, a turret chassis subassembly and a turret cap. The turret screw defines a screw axis and is operably connected to the optical element for adjusting the optical axis in response to rotation of the screw. The turret cap at least partially overlaps the turret chassis subassembly. The zero point adjustment subassembly includes a zero cap connected to the turret screw and a locking mechanism. The locking mechanism releasably secures the zero cap and the turret. The zero point adjustment subassembly permits adjustment of the zero point without the use of tools.

16 Claims, 21 Drawing Sheets

Related U.S. Application Data

(60) Provisional application No. 62/789,769, filed on Jan. 8, 2019.

(58) Field of Classification Search
USPC .................. 42/119, 120, 122, 136; 89/41.19; 356/247; 359/399, 693; 33/385
See application file for complete search history.

(56) References Cited

U.S. PATENT DOCUMENTS

| | | | | |
|---|---|---|---|---|
| 3,095,750 A * | 7/1963 | Mahn | ...................... | G02B 7/10 74/107 |
| 3,930,720 A * | 1/1976 | Uesugi | .................. | G02B 7/105 359/695 |
| 5,113,261 A * | 5/1992 | Morisawa | ................ | G02B 7/10 348/357 |
| RE34,059 E * | 9/1992 | Akitake | .................. | G02B 7/10 359/700 |
| 6,351,907 B1 * | 3/2002 | Otteman | .................. | F41G 1/38 42/120 |
| 8,166,696 B2 * | 5/2012 | Hamilton | .................. | F41G 1/38 42/122 |
| 8,490,317 B2 * | 7/2013 | Adkins | ..................... | F41G 1/38 42/135 |
| 8,806,798 B2 | 8/2014 | Crispin | | |
| 8,919,026 B2 * | 12/2014 | Hamilton | ............... | G02B 23/16 42/119 |
| 8,984,796 B2 * | 3/2015 | Thomas | .................... | F41G 1/18 42/122 |
| 9,170,068 B2 * | 10/2015 | Crispin | ..................... | F41G 1/38 |
| 9,182,773 B2 * | 11/2015 | Campean | ............... | G05G 1/082 |
| 9,188,408 B2 | 11/2015 | Huynh | | |
| RE46,011 E * | 5/2016 | Huber | ........................ | F41G 1/38 |
| 9,677,848 B2 * | 6/2017 | Hamilton | ............... | G02B 7/004 |
| 11,105,587 B2 | 8/2021 | Hamilton et al. | | |
| 2008/0066364 A1 * | 3/2008 | Klepp | ........................ | F41G 1/38 42/122 |
| 2009/0205461 A1 * | 8/2009 | Windauer | ................. | F41G 3/06 74/553 |
| 2010/0175298 A1 * | 7/2010 | Thomas | ................. | F41G 11/001 42/122 |
| 2011/0100152 A1 * | 5/2011 | Huynh | ...................... | F41G 1/22 74/504 |
| 2013/0167425 A1 * | 7/2013 | Crispin | ..................... | F41G 1/16 42/119 |
| 2013/0276345 A1 | 10/2013 | Hamilton | | |
| 2013/0312310 A1 * | 11/2013 | Geller | ........................ | F41G 1/38 42/122 |
| 2017/0199009 A1 * | 7/2017 | Ding | ......................... | G02B 27/36 |
| 2017/0254620 A1 * | 9/2017 | Dasukevich | ............. | F41G 1/38 |
| 2017/0268851 A1 | 9/2017 | Hamilton | | |
| 2017/0328674 A1 | 11/2017 | VanBecelaere | | |
| 2018/0120058 A1 * | 5/2018 | White | ........................ | F41G 1/38 |

OTHER PUBLICATIONS

International Search Report and Written Opinion for International Application No. PCT/US20/12580 dated Aug. 26, 2020, 17 pages.

* cited by examiner

RIFLE SCOPE TURRET WITH TOOL-FREE ZEROING

CROSS-REFERENCE TO RELATED APPLICATIONS

This application is a continuation patent application of U.S. patent application Ser. No. 16/736,440 filed Jan. 7, 2020, which is a non-provisional application of and claims priority to U.S. Provisional Patent Application No. 62/789,769 filed Jan. 8, 2019, which are incorporated herein by reference in their entireties.

FIELD

The disclosure relates to rifle scope turrets, and more particularly to rifle scope turrets with tool-free adjustment capabilities.

BACKGROUND

In the context of rifle scopes, there are several features of rifle scope turrets that are highly desirable to the user: the ability to lock the turret at a dialed position, the inclusion of a zero stop mechanism, infinitely variable zeroing capabilities, tactile and visible revolution indicators, and clear and positive clicking of turrets between each dialed position.

It is critical for the user to know exactly how far a reticle has been adjusted. Therefore, clear, tactile and audible clicks of the turret as it travels through each indicator position allows the user to dial the appropriate elevation without the need to read the engraved indicator on a turret cap. Since turret caps can rotate through several revolutions, and the shooter must know the revolution the turret is on so that the reticle's travel relative to zero is known, a tactile and visible revolution indicator is also critical. The tactile revolution indicator and audible clicks make use of senses other than vision, which allows the user to remain in position behind the rifle scope, therefore decreasing the time required to take an accurate shot. Once the correction has been dialed into the turret, locking the turret down to prevent it from inadvertently changing provides the shooter confidence in continuing to handle the rifle without risk of changing the set value. A zero-stop mechanism allows the user to easily return the scope to zero after dialing the corrections into the turret and is another feature greatly desired by the end user.

In addition to dialing the turret to correct for environmental conditions, another critical task is the zeroing process. Before dialing the turrets from a zero point, as described above, the zero must be established for a given scope, rifle, and ammunition combination. Present turrets that contain one or more of the features mentioned above (e.g., the ability to lock the turret at a dialed position, the inclusion of a zero stop mechanism, infinitely variable zeroing capabilities, tactile and visible revolution indicators, and clear and positive clicking of turrets between each dialed position) often require complicated methods to zero the scope after mounting it to a rifle. For example, many turrets require removal of components from the turret and additional tools. The removal of components from the turret creates unnecessary ingress points for moisture and debris. Further, the more components are removed, the greater the risk of losing or damaging (e.g., wear and tear) the components. The requirement of additional tools increases the amount of gear a shooter must pack and carry.

Accordingly, the need exists for a rifle scope turret that permits zeroing without the need for additional tools and/or removal of components, while still retaining the additional features (e.g., the ability to lock the turret at a dialed position, the inclusion of a zero stop mechanism, infinitely variable zeroing capabilities, tactile and visible revolution indicators, and clear and positive clicking of turrets between each dialed position) desired by users.

SUMMARY

In one embodiment, the disclosure provides rifle scope comprising a turret with a zero point adjustment subassembly. In accordance with embodiments of the disclosure, the rifle scope comprises a scope body; movable optical element defining an optical axis connected to the scope body; a turret comprising (A) a turret screw defining a screw axis and operably connected to the optical element for adjusting the optical axis in response to rotation of the screw, (B) a turret chassis subassembly, and (C) a turret cap at least partially overlapping the turret chassis subassembly; and a zero point adjustment subassembly comprising (A) a zero cap connected to the turret screw, and (B) a locking mechanism releasably securing the zero cap and the turret.

In accordance with embodiments of the disclosure, a locking mechanism for a zero point adjustment subassembly comprises a lock ring, a cam ring, and a plurality of spring followers. In accordance with further embodiments of the disclosure, a locking mechanism for a zero point adjustment subassembly comprises a lever, a conical wedge and a collet. In accordance with further embodiments of the disclosure, a locking mechanism for a zero point adjustment subassembly comprises a brake disc and a locking ring.

Other embodiments will be evident from a consideration of the drawings taken together with the detailed description of the invention.

DETAILED DESCRIPTION

Figure 1:
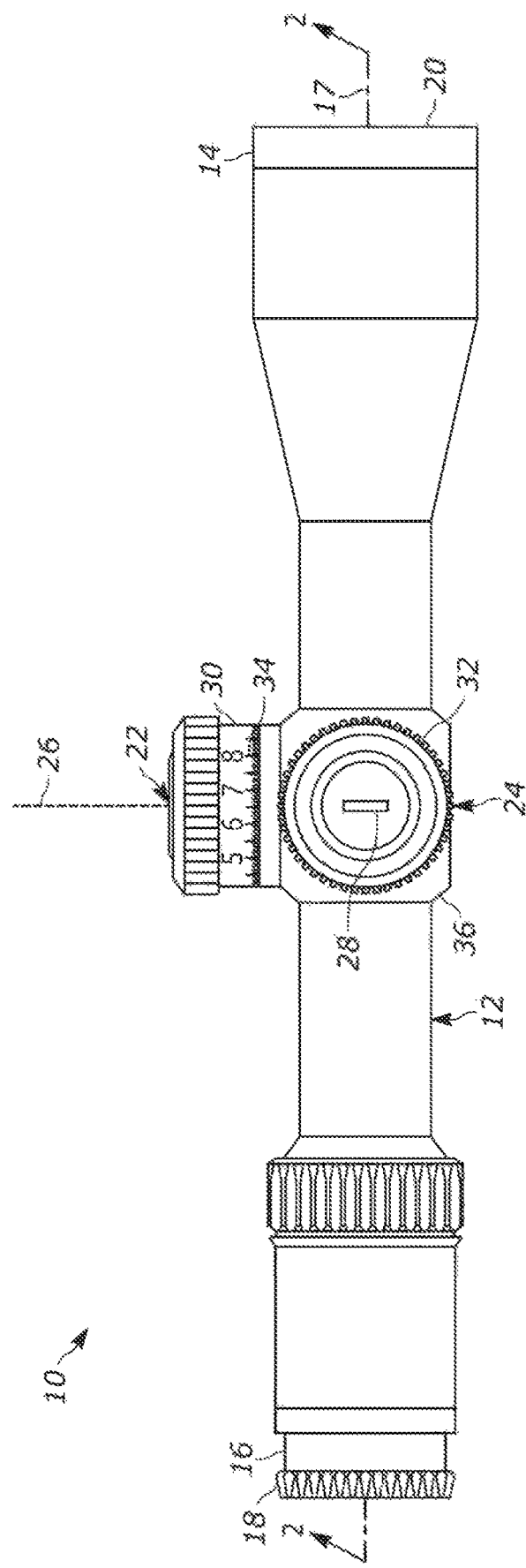
FIG. 1 is a side view of an embodiment of a rifle scope in accordance with embodiments of the disclosure.

The apparatuses and methods disclosed herein will now be described more fully hereinafter with reference to the accompanying drawings, in which embodiments of the disclosure are shown. The apparatuses and methods disclosed herein may, however, be embodied in many different forms and should not be construed as limited to the embodiments set forth herein. Rather, these embodiments are provided so that the disclosure will be thorough and complete and will fully convey the scope of the invention to those skilled in the art.

It will be appreciated by those skilled in the art that the set of features and/or capabilities may be readily adapted within the context of a standalone weapons sight, front-mount or rear-mount clip-on weapons sight, and other permutations of filed deployed optical weapons sights. Further, it will be appreciated by those skilled in the art that various combinations of features and capabilities may be incorporated into add-on modules for retrofitting existing fixed or variable weapons sights of any variety.

It will be understood that when an element or layer is referred to as being "on", "connected to" or "coupled to" another element or layer, it can be directly on, connected or coupled to the other element or layer. Alternatively, intervening elements or layers may be present. In contrast, when an element is referred to as being "directly on," "directly connected to" or "directly coupled to" another element or layer, there are no intervening elements or layers present.

Like numbers refer to like elements throughout. As used herein, the term "and/or" includes any and all combinations of one or more of the associated listed items.

It will be understood that, although the terms first, second, etc. may be used herein to describe various elements, components, regions, and/or sections, these elements, components, regions, and/or sections should not be limited by these terms. These terms are only used to distinguish one element, component, region, or section from another element, component, region, or section. Thus, a first element, component, region, or section discussed below could be termed a second element, component, region, or section without departing from the disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

All patents, patent applications, and non-patent literature references are incorporated herein in their entireties.

Definitions

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, etc., is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, distances from a user of a device to a target.

The term "and/or" as used in a phrase such as "A and/or B" herein is intended to include both A and B; A or B; A (alone); and B (alone). Likewise, the term "and/or" as used in a phrase such as "A, B, and/or C" is intended to encompass each of the following embodiments: A, B, and C; A, B, or C; A or C; A or B; B or C; A and C; A and B; B and C; A (alone); B (alone); and C (alone).

As used herein, an "erector sleeve" is a protrusion from the erector lens mount which engages a slot in the erector tube and/or cam tube or which serves an analogous purpose. This could be integral to the mount or detachable.

As used herein, an "erector tube" is any structure or device having an opening to receive an erector lens mount.

As used herein, a "firearm" is a portable gun, being a barreled weapon that launches one or more projectiles often driven by the action of an explosive force. As used herein, the term "firearm" includes a handgun, a long gun, a rifle, shotgun, a carbine, automatic weapons, semi-automatic weapons, a machine gun, a sub-machine gun, an automatic rifle, and an assault rifle.

As used herein, the term "viewing optic" refers to an apparatus used by a shooter or a spotter to select, identify or monitor a target. The "viewing optic" may rely on visual observation of the target, or, for example, on infrared (IR), ultraviolet (UV), radar, thermal, microwave, or magnetic imaging, radiation including X-ray, gamma ray, isotope and particle radiation, night vision, vibrational receptors including ultra-sound, sound pulse, sonar, seismic vibrations, magnetic resonance, gravitational receptors, broadcast frequencies including radio wave, television and cellular receptors, or other image of the target. The image of the target presented to the shooter by the "viewing optic" device may be unaltered, or it may be enhanced, for example, by magnification, amplification, subtraction, superimposition, filtration, stabilization, template matching, or other means. The target selected, identified or monitored by the "viewing optic" may be within the line of sight of the shooter, or tangential to the sight of the shooter, or the shooter's line of sight may be obstructed while the target acquisition device presents a focused image of the target to the shooter. The image of the target acquired by the "viewing optic" may be, for example, analog or digital, and shared, stored, archived, or transmitted within a network of one or more shooters and spotters by, for example, video, physical cable or wire, IR, radio wave, cellular connections, laser pulse, optical, 802.11b or other wireless transmission using, for example, protocols such as html, SML, SOAP, X.25, SNA, etc., Bluetooth™, Serial, USB or other suitable image distribution method. The term "viewing optic" is used interchangeably with "optic sight."

As used herein, the term "outward scene" refers to a real world scene, including but not limited to a target.

As used herein, the term "shooter" applies to either the operator making the shot or an individual observing the shot in collaboration with the operator making the shot.

As used herein, "zeroing" refers to aligning the point of aim (what the shooter is aiming at) and the point of impact (where the bullet fired from the firearm is actually hitting) at a specific distance. In one embodiment, zeroing is the process of adjusting a rifle scope to a setting in which accurate allowance has been made for both windage and elevation for a specified range.

The disclosure relates to viewing optic turrets. In one embodiment, the disclosure relates to rifle scope turrets, and more particularly to rifle scope turrets having zero adjustment mechanisms that do not require tools to make adjustments. Certain preferred and illustrative embodiments of the disclosure are described below. The disclosure is not limited to these embodiments.

Figure 2:
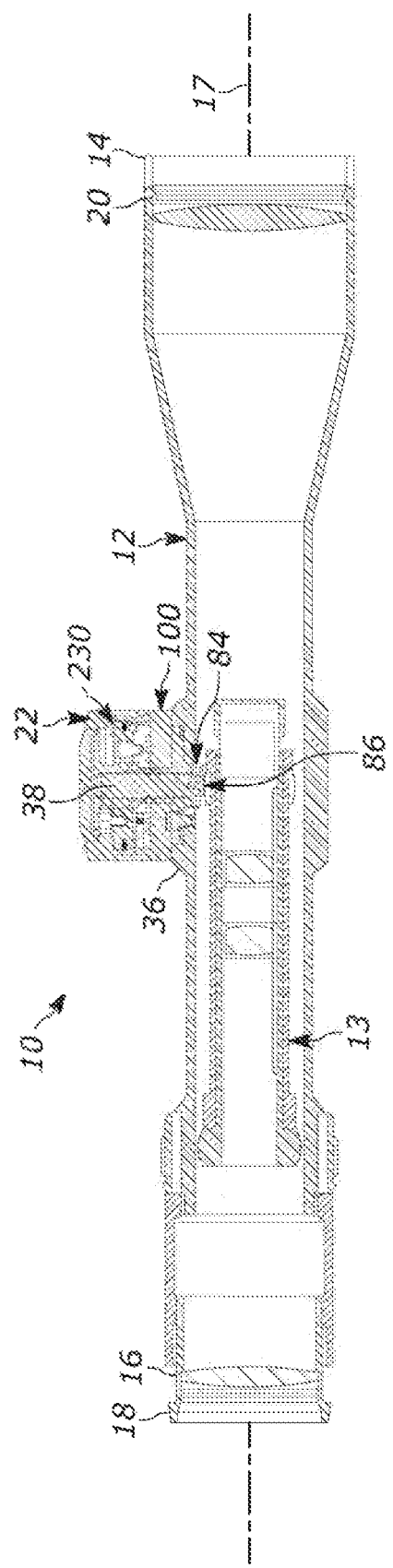
FIG. 2 is a cross-sectional view of the turret taken along line 2-2 in accordance with embodiments of the disclosure.

FIGS. 1-2 illustrate a rifle scope 10, generally, in accordance with embodiments of the disclosure. The rifle scope 10 has a body 12 that encloses a movable optical element 13, which is an erector tube. The scope body 12 is an elongate tube having a larger opening at its front 14 and a smaller opening at its rear 16. An eyepiece 18 is attached to the rear of the scope body 12, and an objective lens 20 is attached to the front of the scope body 12. The center axis of the movable optical element 13 defines the optical axis 17 of the rifle scope 10.

An elevation turret 22 and a windage turret 24 are two knobs in the outside center part of the scope body 12. They are marked in increments by indicia 34 on their perimeters 30 and 32 and are used to adjust the elevation and windage of the movable optical element 13 for points of impact change. These knobs 22, 24 protrude from the turret housing 36. The turrets 22, 24 are arranged so that the elevation turret rotation axis 26 is perpendicular to the windage turret rotation axis 28. Indicia typically include tick marks, each corresponding to a click, and larger tick marks at selected intervals, as well as numerals indicating angle of adjustment or distance for bullet drop compensation.

The movable optical element 13 is adjusted by rotating the turrets one or more clicks. A click is one tactile adjustment increment on the windage or elevation turret of the rifle scope 10, each of which corresponds to one of the indicial 34. In the current embodiment, one click changes the scope's point of impact by 0.1 milliradians (mrad). However, the turrets, systems and concepts disclosed herein can be used with other measures of increments. In other embodiments, the increments can be minutes of angle (MOA) increments.

Using the turrets 22, 24 to adjust the elevation and windage of the movable optical element 13 adjusts the elevation and windage relative to a zero point. That zero point must be established, and, in some instances, it is even desirable to adjust the zero point. Each combination of scope, rifle, and ammunition type may have its own zero point. The zero point for each turret 22, 24 is generally provided as a feature on the given turret. While FIGS. 4-10 illustrate exemplary turrets including a zero point adjustment subassembly 500 in combination with an elevation turret 22, it will be appreciated that the zero point adjustment subassembly 500 may be used with any adjustment turret, including but not limited to a windage turret or parallax adjustment mechanisms.

FIGS. 3-12 illustrate exemplary embodiments of a turret 22 having a zero point adjustment subassembly 500. Generally, a turret 22 includes a turret screw 38, a turret chassis subassembly 230, and a turret cap 501. The turret screw 38 defines a screw axis and is operably connected to the optical element 13 for adjusting the optical element 13 in response to rotation of the screw 38. The turret chassis subassembly 230 includes a turret chassis 100 and the additional components required to accomplish the elevation (or other) adjustment permitted by the turret 22. Exemplary turret chassis subassemblies will be described in further detail.

The turret cap 501 sits over the turret chassis subassembly 230 and is the structure that includes the indicia 34 and, if provided, other visual and/or tactile features. The turret cap 501 has an upper surface 502 that defines a recess 504 (not shown) that is generally circular and centrally located on the turret cap 501. The recess has an upper surface 506 that is generally flat. An opening (not shown) runs through the center of the turret cap 501 through which the turret screw 38 protrudes.

A zero point adjustment subassembly 500, in accordance with embodiments described herein, includes a zero cap 510 that connects, directly or indirectly, with the turret screw 38, and a locking mechanism to secure the zero cap 510 to the turret cap 501. As shown in the FIGS. 3-12, the zero cap 510 is positioned in the recess 504 of the turret cap 501 with at least one component of the locking mechanism positioned between the zero cap 510 and the upper surface 506 of the recess 504.

Figure 3:
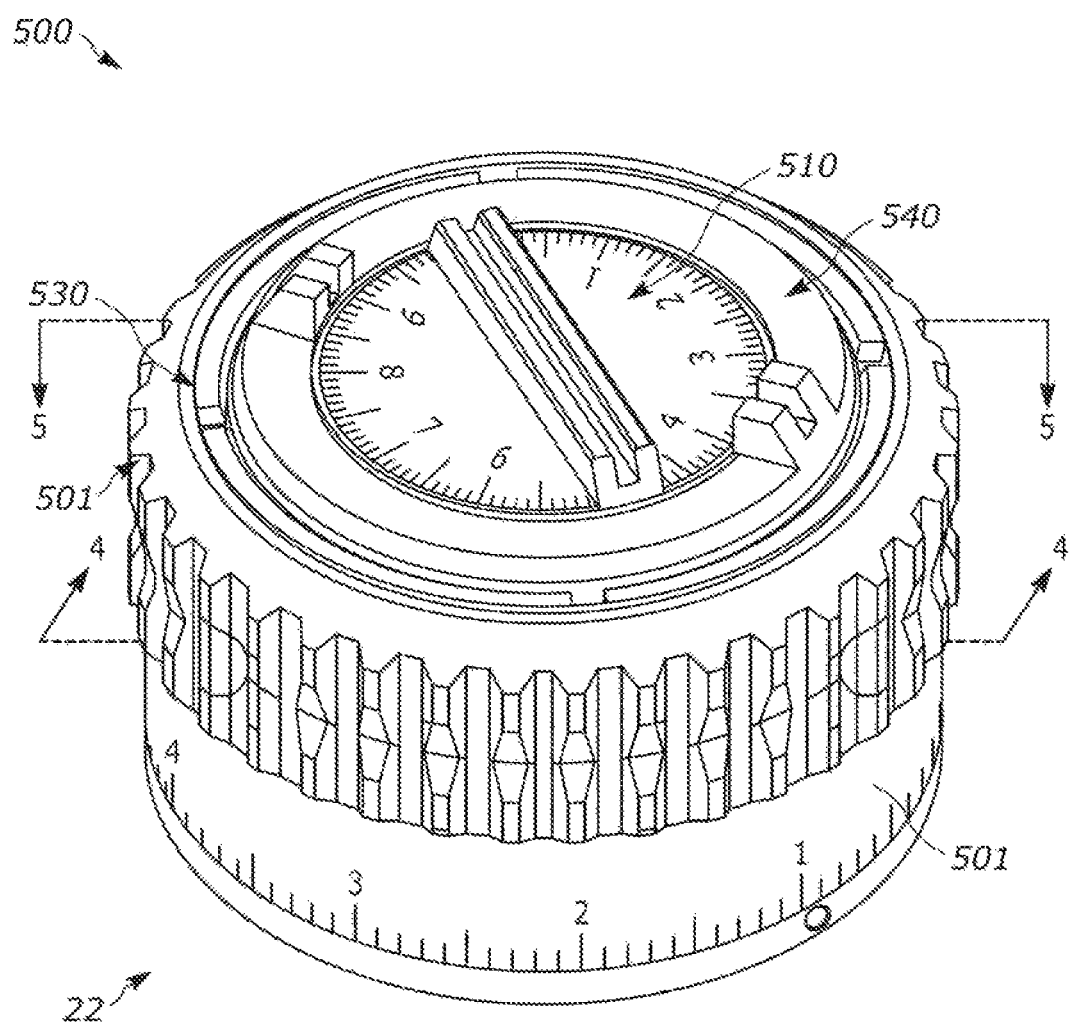
FIG. 3 is an isometric view of an exemplary turret in accordance with embodiments of the disclosure.
Figure 4:
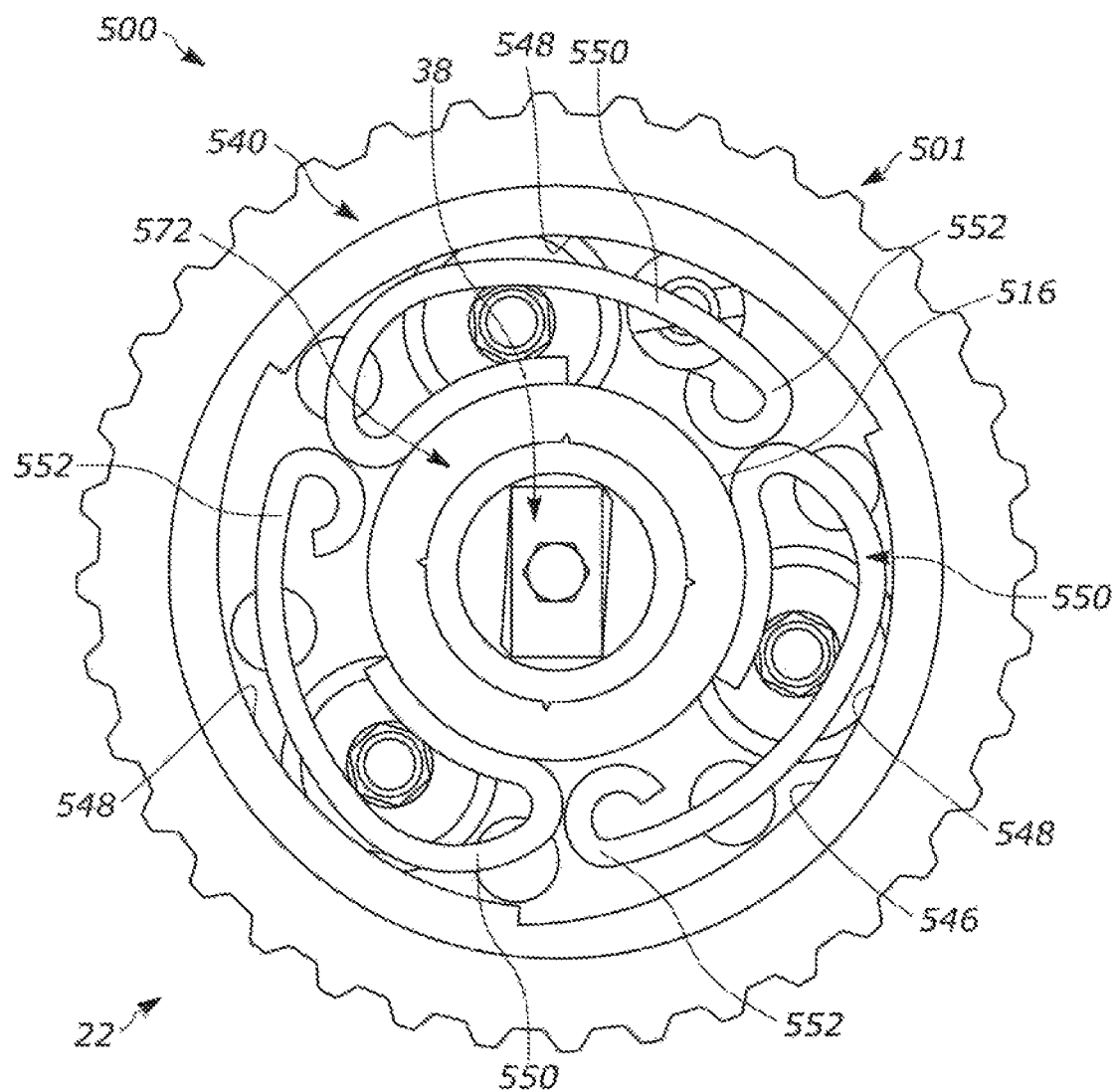
FIG. 4 is a cross-sectional view of the turret of FIG. 2 taken along line 4-4 in accordance with embodiments of the disclosure.
Figure 5:
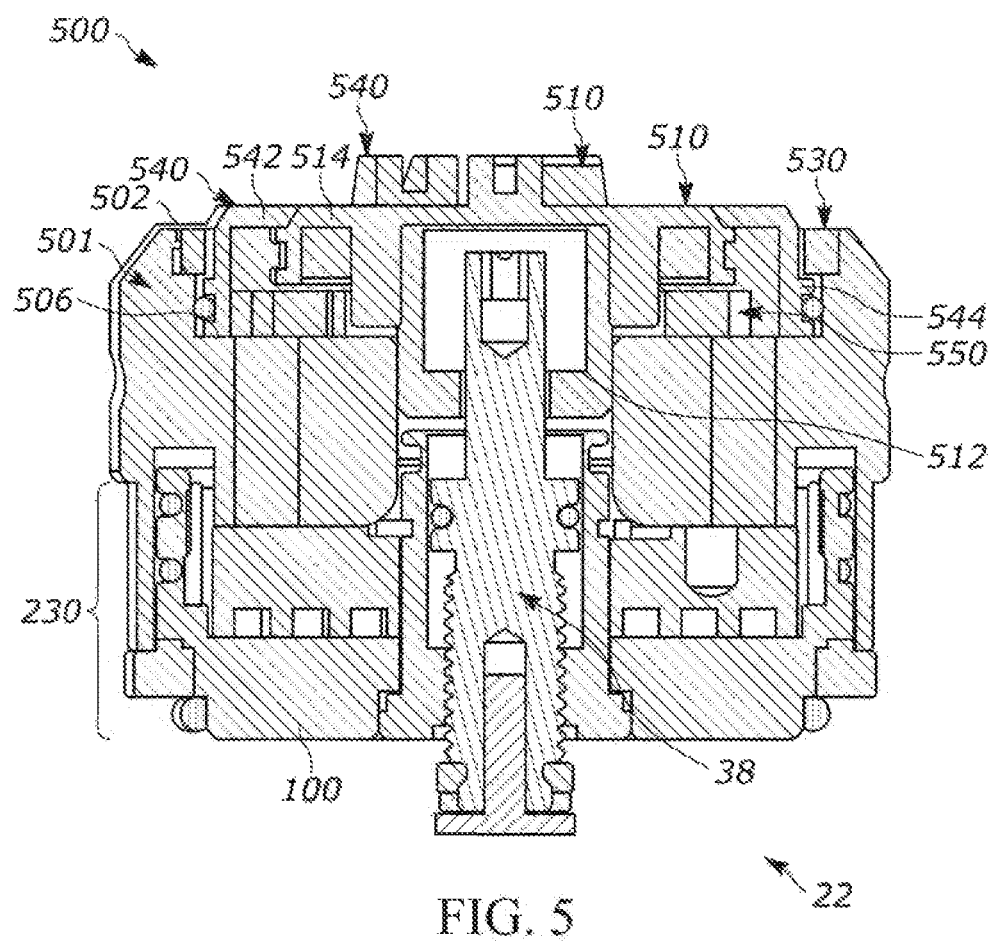
FIG. 5 is a cross-sectional view of the turret of FIG. 2 taken along line 5-5 in accordance with embodiments of the disclosure.

In the representative embodiment shown in FIGS. 3-5, the locking mechanism comprises a lock ring 530, a cam ring 540, a plurality of spring followers 550, and a lock ring lock button 539. The lock ring 530, cam ring 540 and zero cap 510 are positioned concentrically within the recess 504 with the cam ring 540 being externally concentric with the zero cap 510 and the lock ring 530 being externally concentric with both the cam ring 540 and zero cap 510. The zero cap 510 has a downward protruding stem 512 that engages the turret screw 38. A flange 542 on the cam ring 540 sits on top of the peripheral edge 514 of the zero cap 510 and retains the zero cap 510 in the turret cap 501. The lock ring 530 sits on top of a second flange 544 of the cam ring 540 and engages the turret cap 501 to retain the cam ring 540.

The spring followers 550 are sandwiched between the zero cap 510 and the upper surface 506 of the recess 504. The spring followers 550 contact the outer surface 516 of the downward protruding stem 512. In the embodiment shown in FIG. 4, the tails 552 of the spring followers 550 are shown free; however, the tails 552 of the spring followers 550 are generally secured to the underside of the zero cap 510 using a fastener. The fastener is not shown in FIG. 5 for clarity and in order to show the geometry of the spring followers 550.

As shown in FIG. 4, the zero point adjustment subassembly 500 is in its locked position. The inner surface 546 of the cam ring 540 has at least two (e.g., in the embodiment shown, three) ramped surfaces 548. In FIG. 4, each of the spring followers 550 is engaged with the thickest end of the ramped surfaces 548, meaning the spring followers 550 are applying force to the zero cap 510 and prohibit the zero cap 510 from freely spinning. Turning the cam ring 540 in the counterclockwise direction (relative to the embodiment as shown in FIG. 4) results in the spring followers 550 being aligned with the thinner ends of the ramped surfaces 548. Thus, less (or no) force is exerted on the zero cap 510 and the zero cap 510 freely spins within the recess 504. Rotation of the cam ring 540 in the clockwise direction results in the spring followers 550 realigning with the thickest ends of the ramped surfaces 548 and the zero cap 510 being once again locked in position.

It will be appreciated that the zero point adjustment subassembly 500 permits adjustment of the zero point without the use of tools. That is, a user can rotate the cam ring 540 and zero cap 510 by hand. This saves time and does not require a user to turn away from the rifle scope to make any zero point adjustments.

Figure 6:
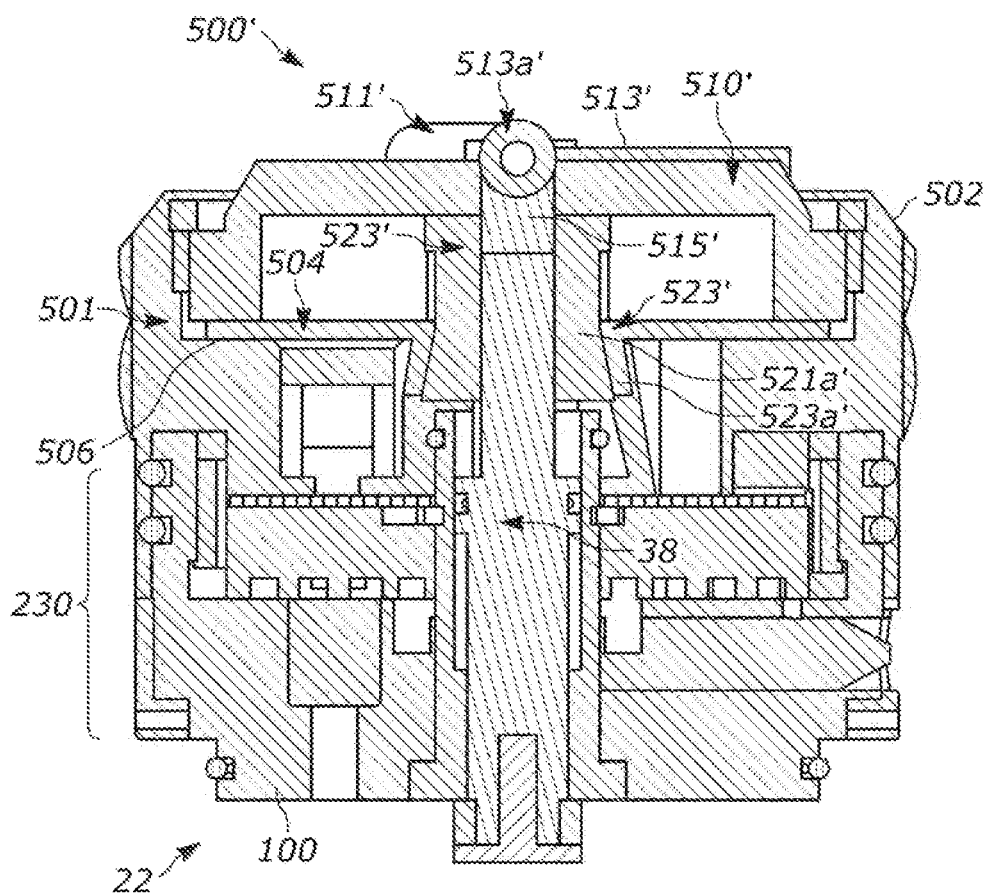
FIG. 6 is a cross-sectional view of a further embodiment of a turret in accordance with embodiments of the disclosure.

FIG. 6 illustrates a further embodiment of a zero point adjustment subassembly 500' in accordance with embodiments of the disclosure. In the embodiment shown in FIG. 6, the zero cap 510' includes a lever 513' with a pivot point 513a'. The lever 513' has a stem 515' that projects through an opening 511' in the zero cap 510' and connects with the turret screw 38. The locking mechanism includes conical wedge 521' and a collet 523'. The conical wedge 521' is positioned around the turret screw 38 and partially extends through the opening (not shown) of the turret cap 501. The conical wedge 521' is operatively connected with the lever 513' such that actuation of the lever 513' causes vertical movement of the conical wedge 521', as described in further detail below. The collet 523' also has a central opening and sits in the recess 504 (not shown) of the turret cap 501 externally concentric with the turret screw 38 and conical wedge 521'.

As shown in FIG. 6, the zero point adjustment subassembly 500' is in the locked position. The lever 513' is flush against the upper surface of the zero cap 510'. The conical wedge 521' has an increasing lower radius (wedge-like radius) and, in this locked position, the conical wedge 521' has been forced upwards by the lever 513' such that the thicker portion 521a' of the conical wedge 521' contacts the flange 523a' of the collet 523', causing the collet 523' to expand radially outward into the turret cap 501 and lock the zero cap 510' from freely spinning. To adjust the zero point, the lever 513' is flipped along its pivot point 513a', which lowers the conical wedge 521'. With the collet 523' disengaged from the conical wedge 521', the zero cap 510' can spin freely.

It will be appreciated that the zero point adjustment subassembly 500' permits adjustment of the zero point without the use of tools. That is, a user can actuate the lever 513' and rotate the zero cap 510' by hand. This saves time and does not require a user to turn away from the rifle scope to make any zero point adjustments.

Figure 7:
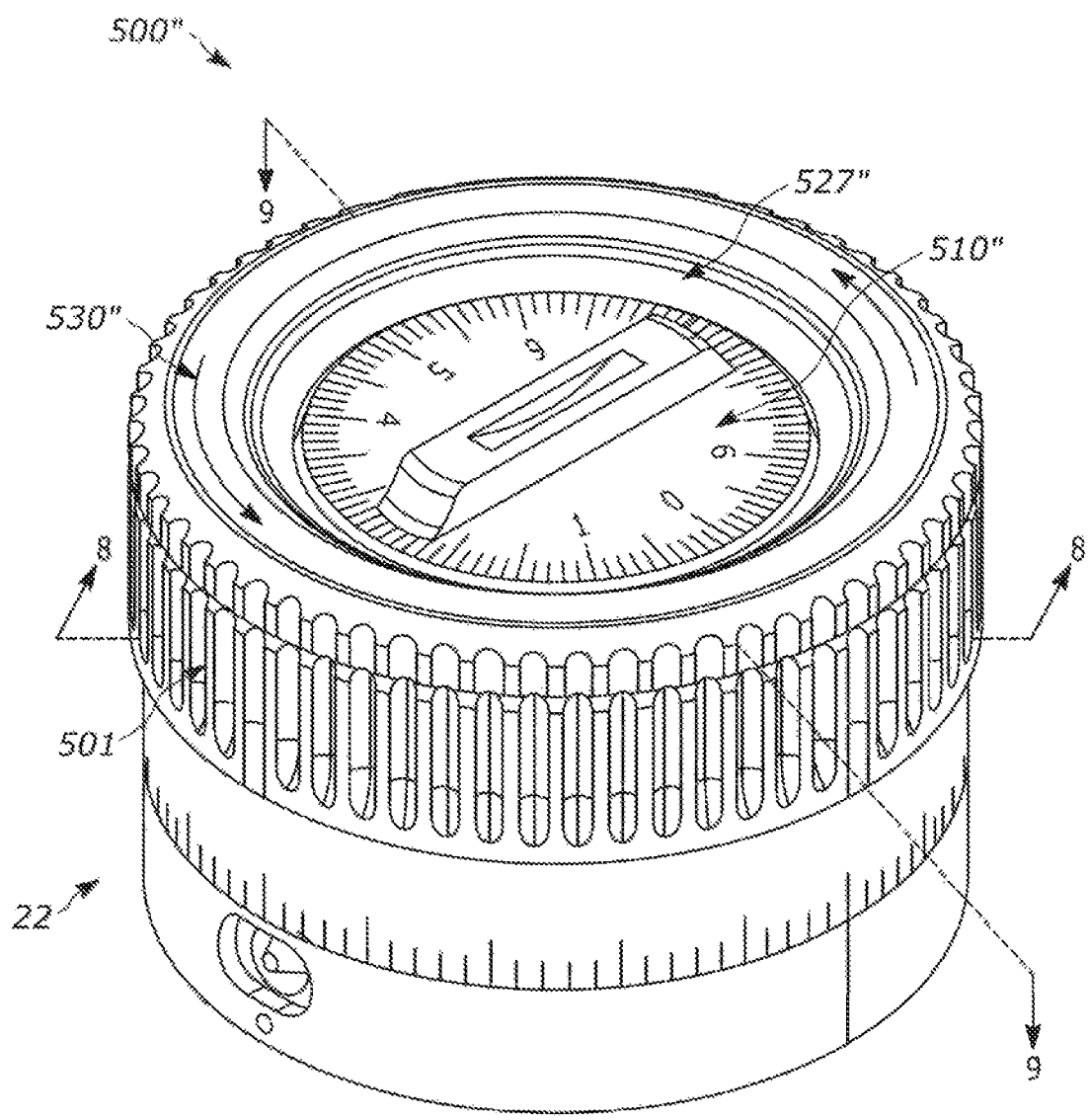
FIG. 7 is an isometric view of a further embodiment of a turret in accordance with embodiments of the disclosure.
Figure 8:
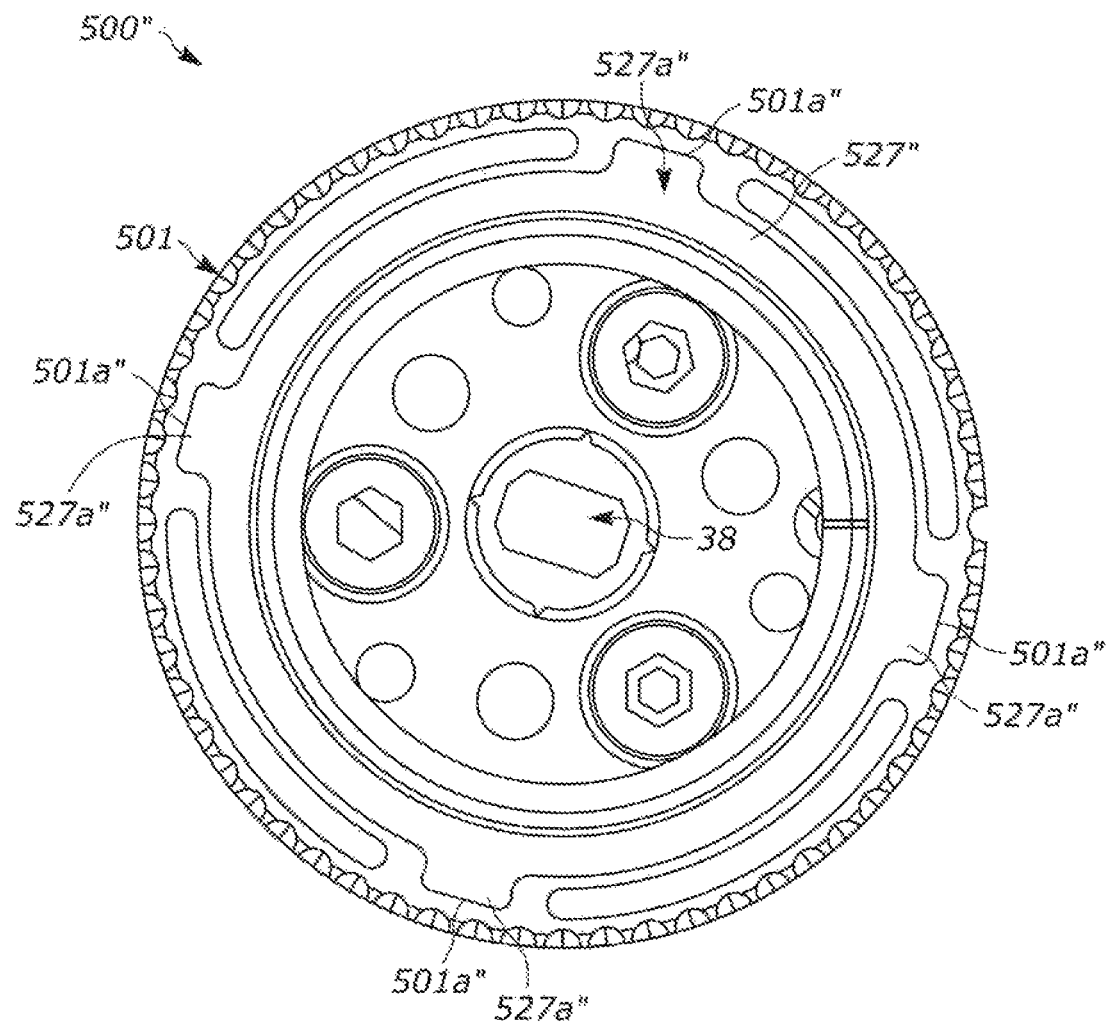
FIG. 8 is a cross-sectional view of the turret taken along line 8-8 in accordance with embodiments of the disclosure.
Figure 9:
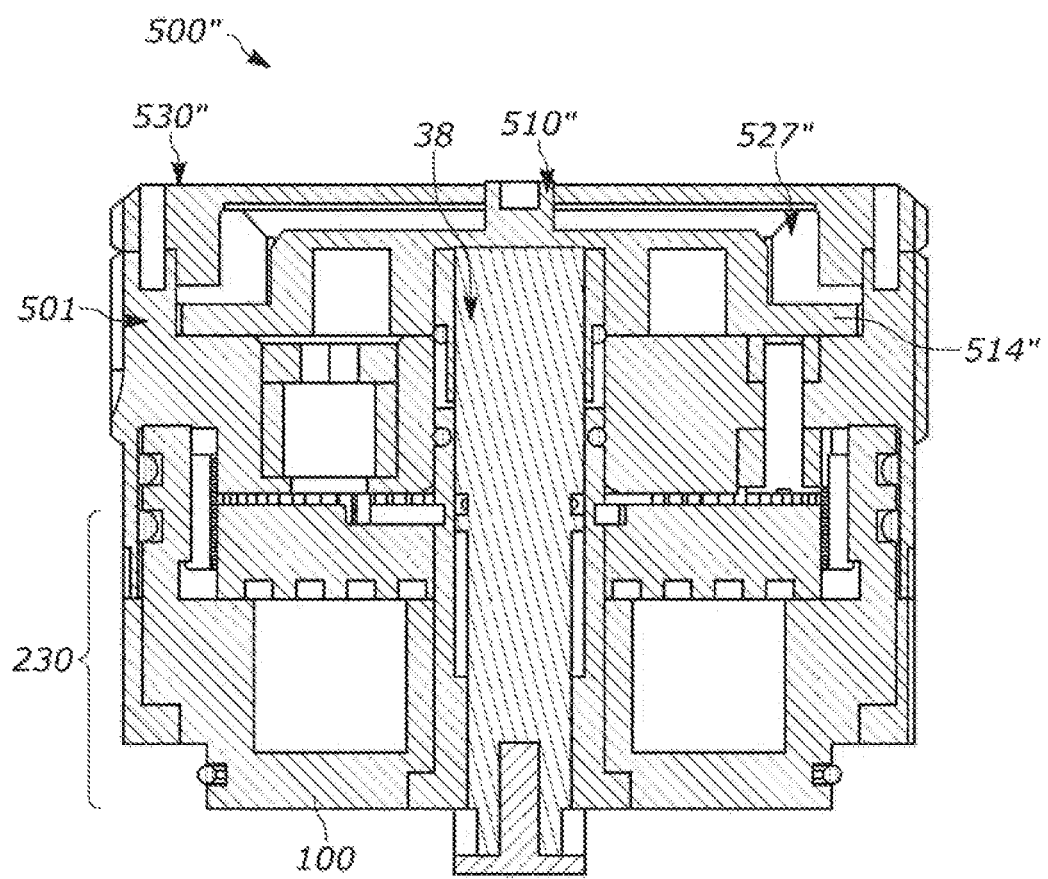
FIG. 9 is a cross-sectional view of the turret taken along line 9-9 in accordance with embodiments of the disclosure.

FIGS. 7-9 illustrate a further embodiment of a zero point adjustment subassembly 500" in accordance with embodiments of the disclosure. The zero point adjustment subassembly 500" includes the zero cap 510' and the locking mechanism 520". The locking mechanism 520" includes a brake disc 527" and a lock ring 530".

As shown in FIGS. 7-8, the zero cap 510' engages the turret screw 38 and sits in the recess (not shown) of the turret cap 501. The brake disc 527" is circular with a central opening and sits over a flange 514" of the zero cap 510" in the recess. The brake disc 527" is keyed to the turret cap 501 via the mating of projections 527a" on the brake disc 527" with recesses 501a" on the inside wall of the turret cap 501. The brake disc 527" is therefore prohibited from rotating but is free to translate vertically. The lock ring 530" is externally concentric to the zero cap 510" and the brake disc 527" and rotatably secured with the turret cap 501 via a threaded engagement. As the lock ring 530" is rotated into a locked position (e.g., clockwise), its vertical translation downward applies a force to the brake disc 527". The brake disc 527" transfers that downward force to the zero cap 510" that is thereby prohibited from freely spinning. Rotation of the lock ring 530" in the opposite direction (e.g., counterclockwise) releases the force on the brake disc 527", and therefore zero cap 510", to allow the zero cap 510" to freely spin in the turret cap 501.

Figure 10:
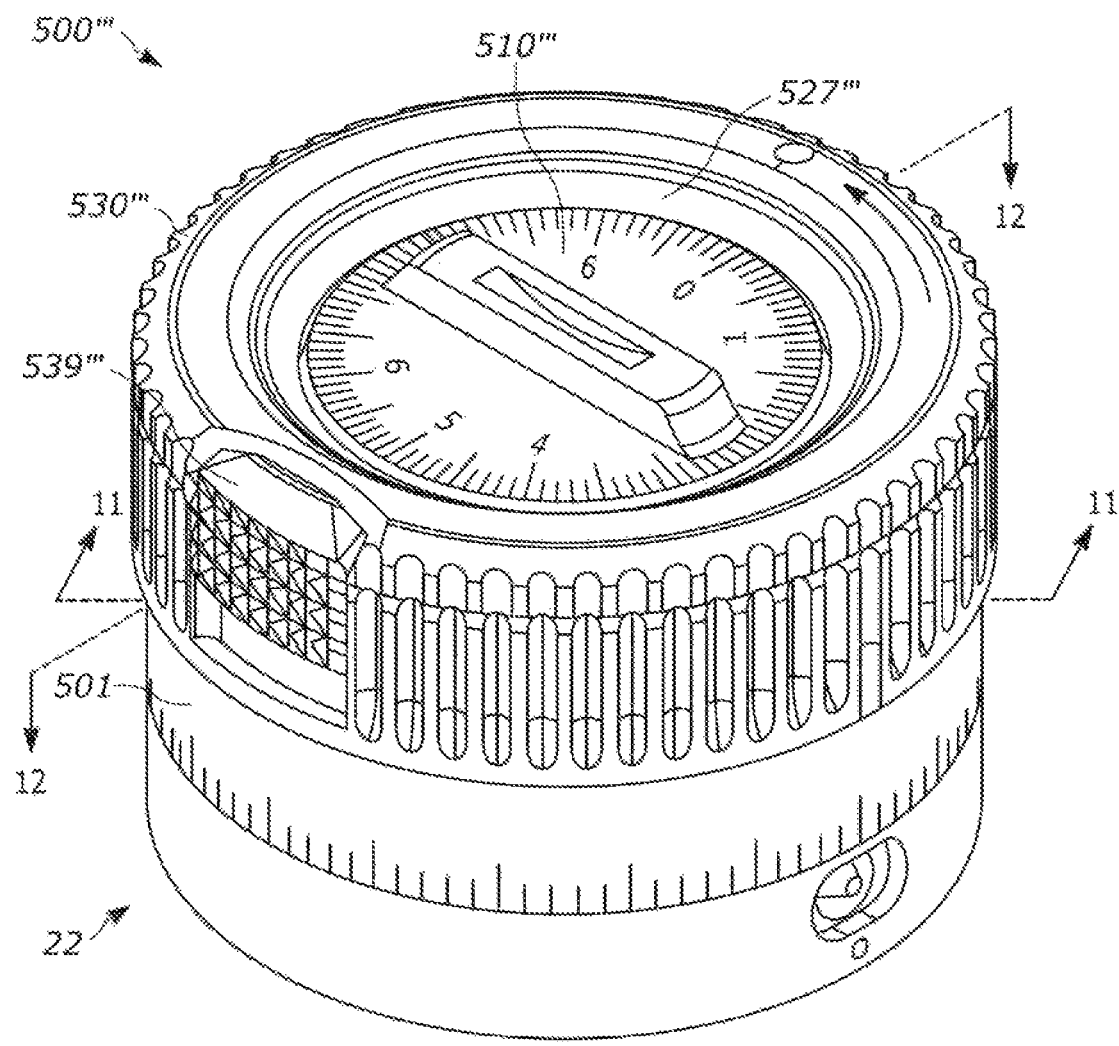
FIG. 10 is an isometric view of a further embodiment of a turret in accordance with embodiments of the disclosure.
Figure 11:
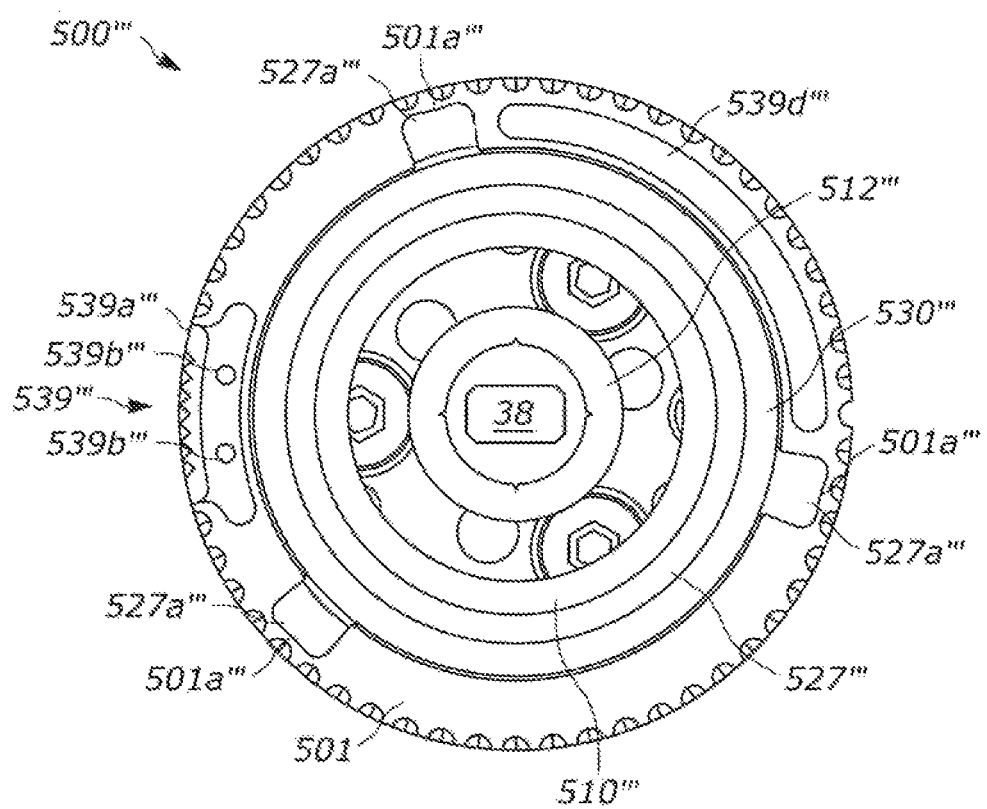
FIG. 11 is a cross-sectional view of the turret taken along line 11-11 in accordance with embodiments of the disclosure.
Figure 12:
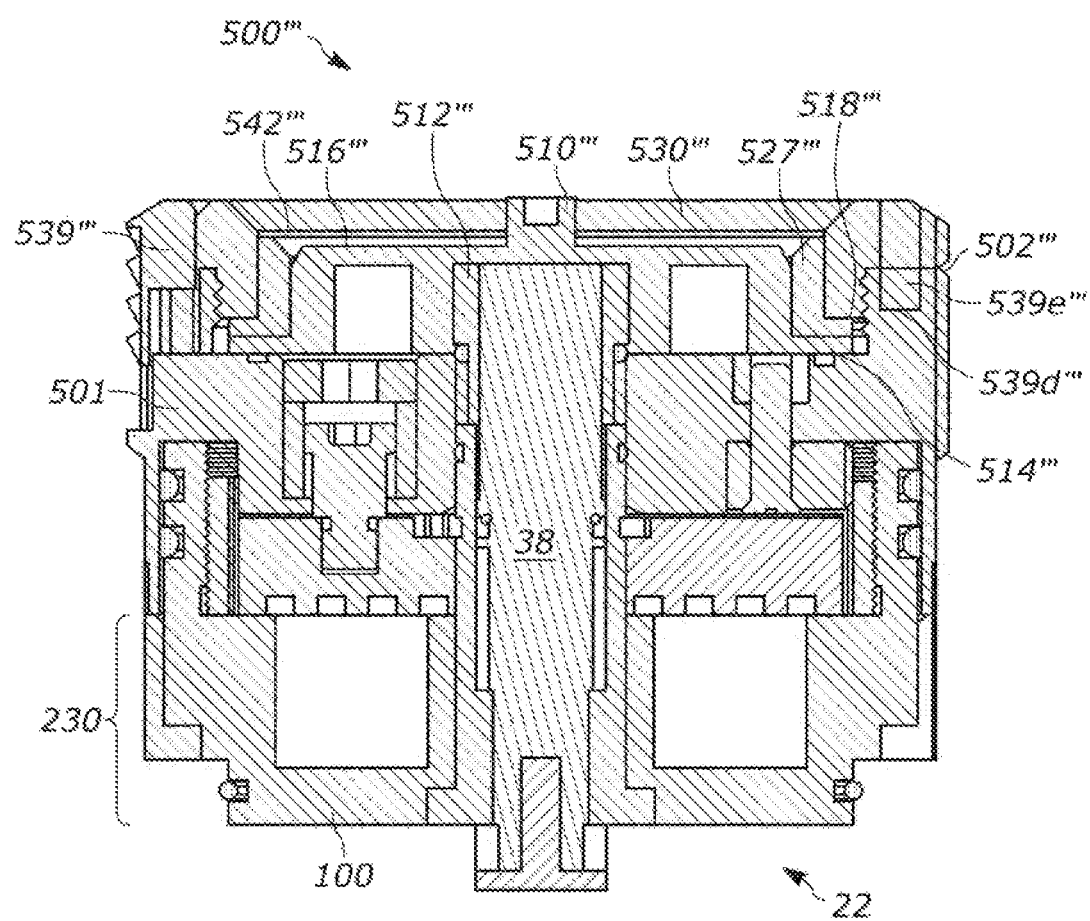
FIG. 12 is a cross-sectional view of the turret taken along line 12-12 in accordance with embodiments of the disclosure.

FIGS. 10-12 illustrate a further embodiment of a zero point adjustment subassembly 500''', which is a variation of subassembly 500", in accordance with embodiments of the disclosure. The zero point adjustment subassembly 500''' includes the zero cap 510''' and the locking mechanism 520''' which is composed of the locking ring 530', a brake disc 527''', and a lock ring lock button 539'''. The locking ring 530', brake disc 527' and zero cap 510''' are all positioned concentrically within the recess (not shown) with the brake disc 527''' being externally concentric with the zero cap 510''' and the lock ring 530''' being externally concentric with both the brake disc 527''' and the zero cap 510'''. The zero cap 510' has a downward protruding stem 512''' that engages the turret screw 38. A flange 542 on the brake disc 527' sits on top of at least a portion of the upper surface 516''' of the zero cap 510' and retains the zero cap 510''' in the turret cap 501. The locking ring 530' sits on top of a flange 518' of the brake disc 527''' and engages the turret cap 501. In the embodiment shown, the locking ring 530''' is in threaded engagement with the turret cap 501.

As shown in FIGS. 10-11, the zero cap 510''' engages the turret screw 38 and sits in the recess (not shown) of the turret cap 501. The brake disc 527''' is circular with a central opening and sits over a flange 514''' of the zero cap 510''' in the recess. The brake disc 527''' is keyed to the turret cap 501 via the mating of projections 527a''' on the brake disc 527''' with recesses 501a''' on the inside wall of the turret cap 501. The brake disc 527''' is therefore prohibited from rotating but is free to translate vertically. The lock ring 530''' is externally concentric to the zero cap 510''' and the brake disc 527' and rotatably secured with the turret cap 501 via a threaded engagement. As the lock ring 530''' is rotated into a locked position (e.g., clockwise), its vertical translation downward applies a force to the brake disc 527'. The brake disc 527' transfers that downward force to the zero cap 510''' that is thereby prohibited from freely spinning. Rotation of the lock ring 530''' in the opposite direction (e.g., counterclockwise) releases the force on the brake disc 527", and therefore zero cap 510''', to allow the zero cap 510''' to freely spin in the turret cap 501.

As shown in FIGS. 10-12, the zero point adjustment subassembly 500' further includes a lock ring lock button 539". The lock ring lock button 539''' includes and outer portion 539a''' which, in the embodiment shown, is a portion of the turret cap 501 and includes a tactile element different from the surrounding portions of the turret cap 501. As shown in FIGS. 10-12, the lock ring lock button 539''' is in its locked position, meaning rotation of the lock ring 530, and therefore zero cap 510''' is prohibited. Referring to FIG. 11, the lock ring lock button 539''' is provided at least one (in the embodiment shown, two) spring-containing guide-rods 539b". Once the upper surface 539c''' of the button 539''' is below the level of the lock ring 530''', the lock ring 530''' can be freely rotated. The under surface of the lock ring 530''' will cover the button 539''' to prevent the lock ring lock button 539''' from returning to its locked position while a user is making adjustments. One will appreciate that the springs of the spring-containing guide-rods 539b''' "automatically" force the button 539''' back upward into the locked position once the user has rotated the lock ring 530''' into the rotationally locked position.

Referring to FIG. 12, the turret cap 501 further includes a groove 539d''' and the locking ring 530''' further includes a corresponding protuberance 539e'''. The groove 539d'''/protuberance 539e" system limits rotation of the locking ring 530''' while the lock ring lock button 539''' is depressed. This ensures that the parts of the subassembly 500''' are captive in addition to limiting rotation. Since rotation is limited, the locking ring 530''' cannot be unthreaded and removed from the turret cap 501.

It will be appreciated that the zero point adjustment subassemblies 500" and 500''' permit adjustment of the zero point without the use of tools. That is, a user can rotate the lock ring 530"/530''' and zero cap 510"/510''' by hand and similarly manipulate the other components of the subassemblies 500" and 500''' by hand. This saves time and does not require a user to turn away from the rifle scope to make any zero point adjustments.

While the zero point adjustment subassemblys 500, 500', 500" and 500''' described above can be used with many different styles of chassis subassemblies, the exemplary turret chassis subassembly 400 illustrated in FIGS. 3-12 is in accordance with that disclosed in U.S. Pat. No. 8,919,026 which is incorporated herein by reference. Such an exemplary turret chassis subassembly 230 will now be described in further detail.

Figure 13:
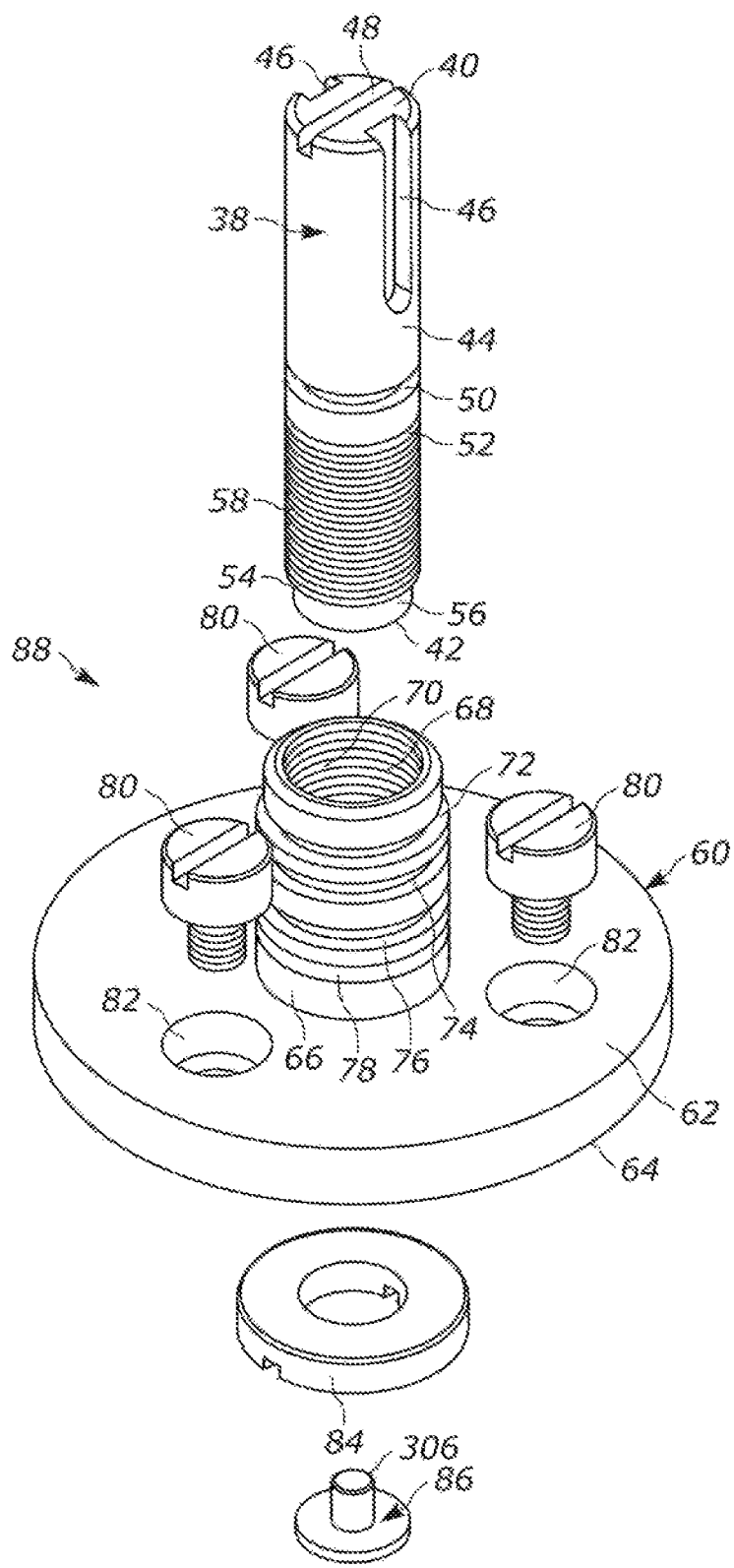
FIG. 13 is a top perspective exploded view of a turret screw subassembly in accordance with embodiments of the disclosure.

As shown in FIG. 13, the turret screw 38 is part of a turret screw subassembly 88. The turret screw subassembly consists of the turret screw 38, a turret screw base 60, a friction pad 86, and various fasteners. The turret screw 38 in the embodiment shown is a cylindrical body made of brass. The top 40 of the turret screw 38 defines a slot or other feature, such as threads, 40 that engage the zero point adjustment subassembly 500 (not shown). Two opposing cam slots 46 run from the top part way down the side 44. Two o-ring grooves 50 and 52 are on the side located below the cam slots. The bottom 42 of the turret screw has a reduced radius portion 56 that defines a ring slot 54. The ring slot 54 receives a retaining ring 84, and a bore 304 in the bottom receives the shaft 306 of the friction pad 86. The side of the turret screw immediately below the o-ring groove 52 and above the ring slot 54 is a threaded portion 58.

The turret screw base 60 is a disc-shaped body that may also be made of brass. A cylindrical collar 66 rises from the center to the top 62 of the turret screw base. The collar has a turret screw bore 68 with threads 70. The exterior of the collar defines a set screw V-groove 78 above the top of the turret screw base, an o-ring groove 74 above the o-ring groove 76, and a ring slot 72 above the o-ring groove 74. The turret screw base 60 has three mount holes 82 with smooth sides and a shoulder that receives screws 80.

Figure 14:
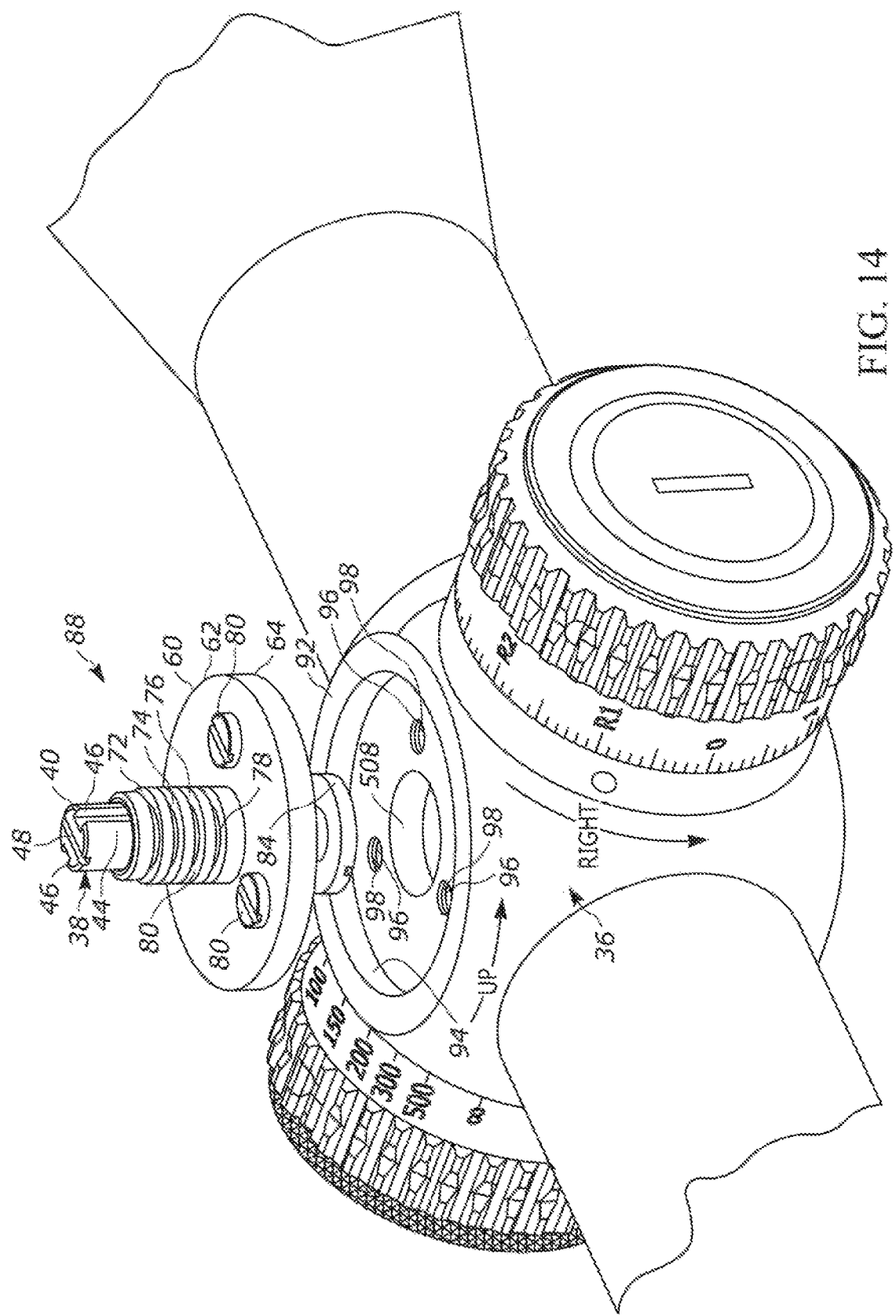
FIG. 14 is a top perspective exploded view of the turret screw subassembly and turret housing in accordance with embodiments of the disclosure.

The fitting of the turret screw subassembly 88 to the turret housing 36 is shown in FIG. 14. The top 92 of the turret housing defines a recess 94. Three mount holes 96 with threads 98 and a smooth central bore 508 are defined in the top of the turret housing within the recess. The threads 70 of the turret screw bore 68 are such that the turret screw bore may receive the threads 58 on the turret screw 38. The retaining ring 84 limits upward travel of the turret screw 38 so that the turret screw 38 cannot be inadvertently removed from the turret screw bore.

When the turret screw subassembly 88 is mounted on the turret housing 36, screws 80 are inserted into the mount holes 82 and protrude from the bottom 64 of the turret screw base. The screws are then screwed into the mount holes 96 in the turret housing. Subsequently, the turret screw base remains in a fixed position with respect to the scope body 12 when the elevation turret 22 is rotated. This essentially makes the turret screw base functionally unitary with the scope body, and the turret screw base is not intended to be removed or adjusted by the user. The smooth central bore 508 in the top of the turret housing permits passage of the friction pad 86 and the bottom 42 of the turret screw 38 into the scope body 12.

Figure 15:
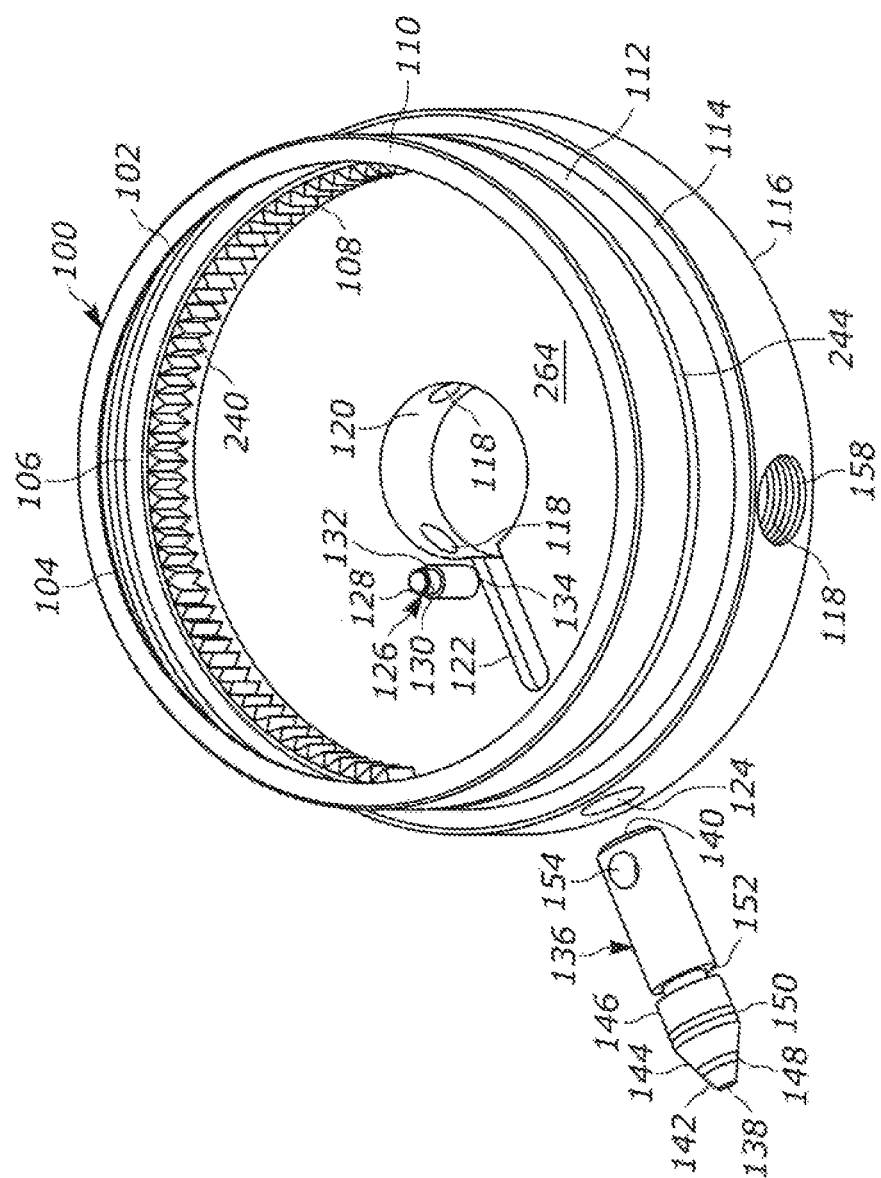
FIG. 15 is a top perspective view of the turret chassis and indicator in accordance with embodiments of the disclosure.

Turning to FIG. 15, the top 110 of the turret chassis 100 has an interior perimeter 102 with a relief cut 240 adjacent to the floor 264, a toothed surface 108 above the relief cut, a lower click groove 106 above the toothed surface 108, and an upper click groove 104 above the lower click groove 106. The relieve cut 240 is for the tool that cuts the toothed surface 108. The floor defines a smooth central bore 120 and a slot 122. The smooth central bore 120 permits passage of the friction pad 86 and the bottom 42 of the turret screw 38 through the turret chassis 100.

The exterior perimeter 112 of the turret chassis 100 defines an o-ring groove 244. Near the bottom 116 of the turret chassis, the exterior perimeter widens to define a shoulder 114. Three holes 118 with threads 158 communicate from the exterior perimeter through the turret chassis to the smooth bore 120. In the current embodiment, the turret chassis 100 is made of steel.

The slot 122 in the floor 264 of the turret chassis 100 communicates with a hole 124 in the exterior perimeter 112 of the turret chassis 100. The hole 124 receives an indicator, such as an elevation indicator 136.

The rear 140 of the indicator 136 defines a cam pin hole 154. The front 138 of the indicator 136 has two stripes 148 and 150 and an o-ring groove 152. The stripe 148 divides a first position 142 from a second position 144. The stripe 150 divides a second position 144 from a third position 146. As shown, the elevation indicator 136 is made of painted black steel and the stripes are white lines that do not glow, but which could be luminous in an alternative embodiment.

The cam pin hole 154 receives the bottom 134 of a cam pin 126. In the current embodiment, the cam pin is a cylindrical body made of steel. The top 128 of the cam pin 126 has a reduced radius portion 130 that defines a shoulder 132. The reduced radius portion of the cam pin protrudes upward through the slot 122 above the floor 264 of the turret chassis 100.

Figure 16A:
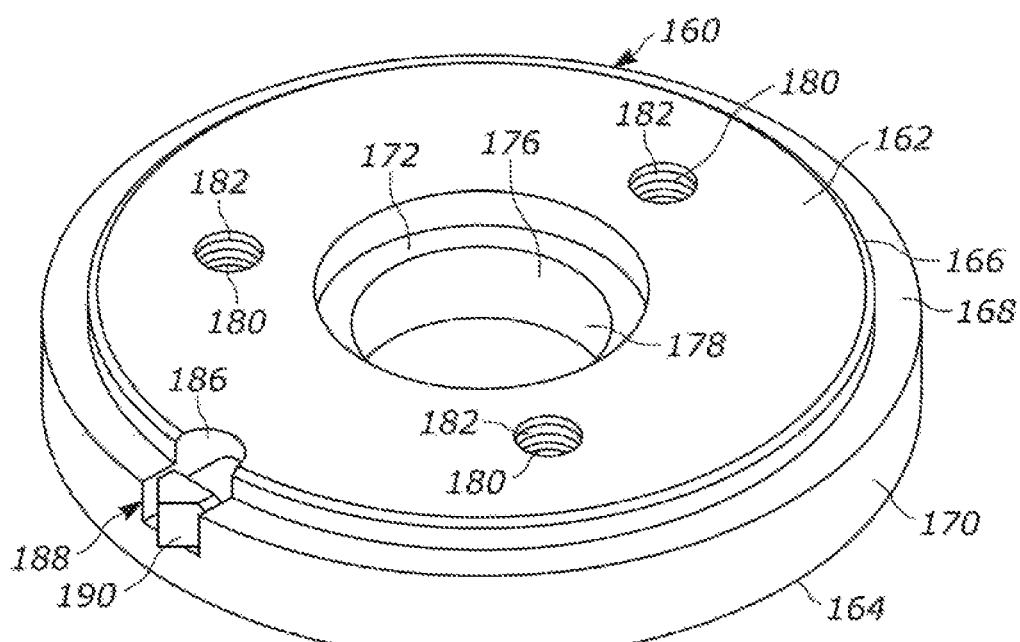
FIG. 16A is a top perspective view of the cam disc in accordance with embodiments of the disclosure.
Figure 16B:
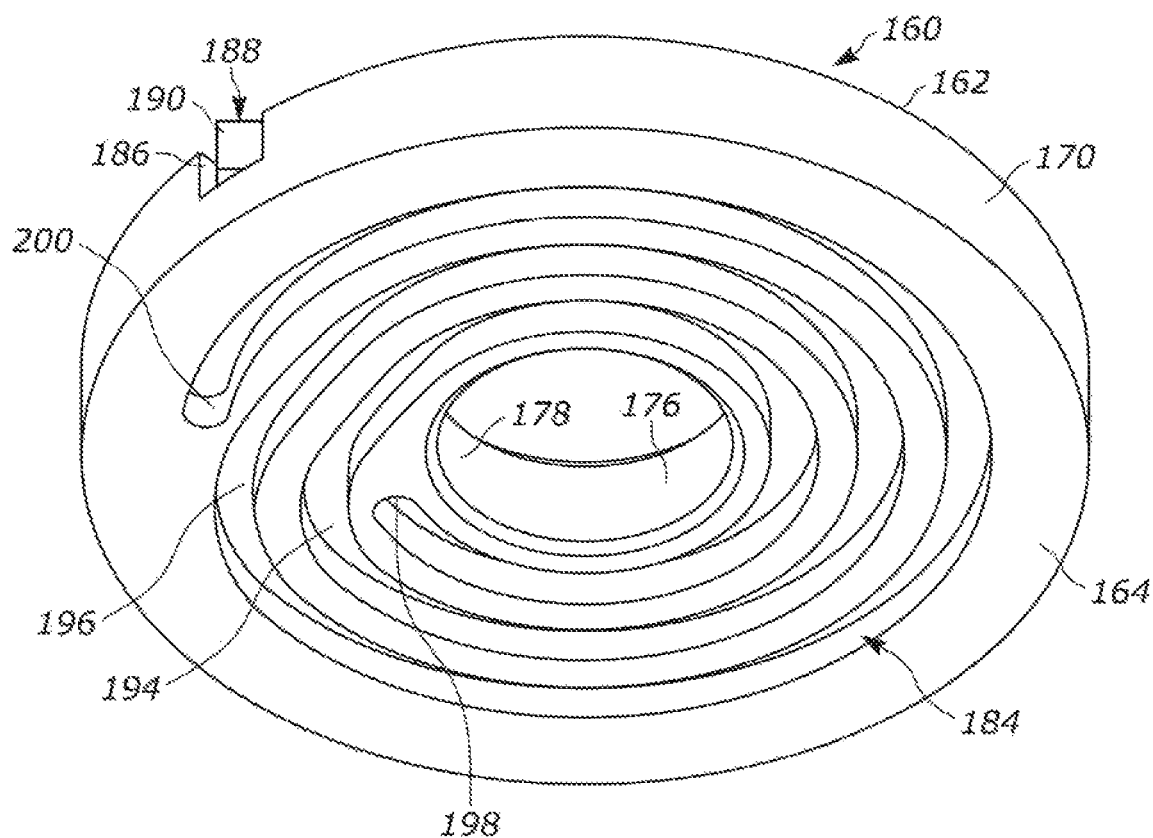
FIG. 16B is a bottom perspective view of the cam disc in accordance with embodiments of the disclosure.

FIGS. 16A and 16B illustrate a cam disc 160 with a top face 162 and a bottom face 164. The top face 162 has a reduced radius portion 166 that defines a shoulder 168 around the exterior perimeter 170 of the cam disc 160. The top face 162 also defines three mount holes 180 with threads 182. A reduced radius central portion 176 defines a shoulder 172 and a smooth central bore 178. The smooth central bore 178 permits passage of the turret screw subassembly 88 through the cam disc 160.

A radial clicker channel 186 in the top 162 of the exterior perimeter 170 receives a clicker 188 that reciprocates in the channel 186, and is biased radially outward. The front, free end 190 of the clicker 186 protrudes from the exterior perimeter 170. The clicker 186 has a wedge shape with a vertical vertex parallel to the axis of rotation of the turret and is made of steel.

Figure 17:
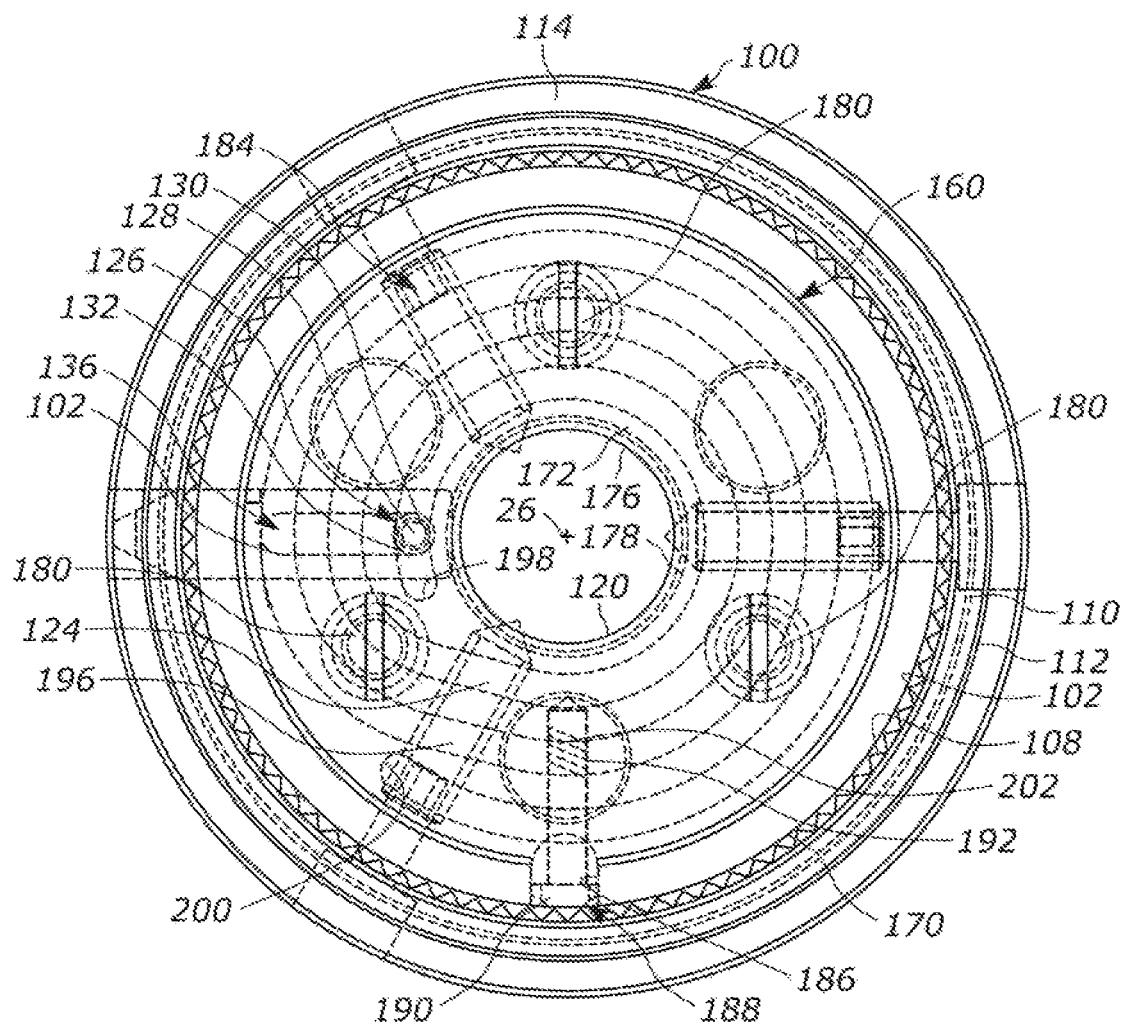
FIG. 17 is a top view of the cam disc inserted into the turret chassis in accordance with embodiments of the disclosure with the cam disc rendered partially transparent.

The bottom 164 of the cam disc 160 is a planar surface perpendicular to the elevation turret rotation axis 26 that defines a recessed spiral channel 184. The spiral channel 184 terminates in a zero stop surface 198 when traveled in a clockwise direction and terminates in an end of travel stop surface 200 when traveled in a counterclockwise direction. When traveled in a counterclockwise direction, the spiral channel 184 defines a first transition 194 and a second transition 196 when the spiral channel begins to overlap itself for the first time and second time, respectively. The spiral channel 184 is adapted to receive the reduced radius portion 130 of the cam pin 126. The spiral channel 184 and the stop surfaces 198, 200 are integral to the cam disc 160 and are not adjustable FIG. 17 the cam disc 160 is shown installed in the turret chassis 100. The spiral channel 184 receives the reduced radius portion 130 of the cam pin 126. The clicker 188 protrudes from the clicker channel 186 in the exterior perimeter 170 of the cam disc 160. A spring 202 at the rear 192 of the clicker 188 outwardly biases the clicker 188 such that the clicker 188 is biased to engage with the toothed surface 108 on the interior perimeter 102 of the turret chassis 100. When the cam disc 160 rotates as the turret 22 is rotated when changing settings (e.g., elevation settings), the clicker 188 travels over the toothed surface 108, thereby providing a rotational, resistant force and making a characteristic clicking sound.

In the embodiment shown, the toothed surface 108 has 100 teeth, which enables 100 clicks per rotation of the elevation turret 22. The spiral channel 184 is formed of a several arcs of constant radius that are centered on the disc center, and extend nearly to a full circle, and whose ends are joined by transition portions of the channel, so that one end of the inner arc is connected to the end of the next arc, and so on to effectively form a stepped spiral. This provides for the indicator to remain in one position for most of the rotation, and to transition only in a limited portion of turret rotation. In an alternative embodiment the spiral may be a true spiral with the channel increasing in its radial position in proportion to its rotational position. In the most basic embodiment, the channel has its ends at different radial positions, with the channel extending more than 360 degrees, the ends being radially separated by material, and allowing a full 360 degree circle of rotation with the stop provided at each channel end.

The turret 22 is positioned at the indicium 34 corresponding to 0° of adjustment when the cam pin 126 is flush with the zero stop surface 198. In an embodiment, the spiral channel 184 holds the cam pin 126 in a circular arc segment at a constant distance from the rotation axis 26 until the elevation turret has rotated 9 mrad (324°). The first transition 194 occurs as the turret 22 rotates counterclockwise from 9 mrad (324°) to 10 mrad (360°). During the first transition, the spiral channel 184 shifts the cam pin 126 towards the exterior perimeter 170 so the spiral channel 184 can begin overlapping itself. As the turret 22 continues its counterclockwise rotation, the spiral channel 184 holds the cam pin 126 in a circular arc segment at a constant further distance from the rotation axis 26 until the elevation turret has rotated 19 mrad (684°). The second transition 196 occurs as the turret 22 rotates counterclockwise from 19 mrad (684°) to 20 mrad) (720°). During the second transition, the spiral channel shifts the cam pin 126 even further towards the exterior perimeter 170 so the spiral channel 184 can overlap itself a second time. As the turret 22 continues its counterclockwise rotation, the spiral channel 184 holds the cam pin 126 in a circular arc segment at a constant even further distance from the central bore 178 until the elevation turret has rotated 28.5 mrad (1026°). At that time, the cam pin 126 is flush with the end of travel stop surface 200, and further counterclockwise rotation of the turret 22 and elevation adjustment are prevented. In the embodiment shown, the first and second transitions 194, 196 are angled at about 36° (10% of the rotation) to enable adequate wall thickness between the concentric circular arc segments about the rotation axis 26 of the spiral channel. The cam pin diameter determines the overall diameter of the turret. Because there are three rotations, any increase in diameter will be multiplied by three in how it affects the overall turret diameter. In an embodiment, a cam pin diameter of 1.5 mm provides adequate strength while remaining small enough to keep the overall diameter of the turret from becoming too large.

Figure 18A:
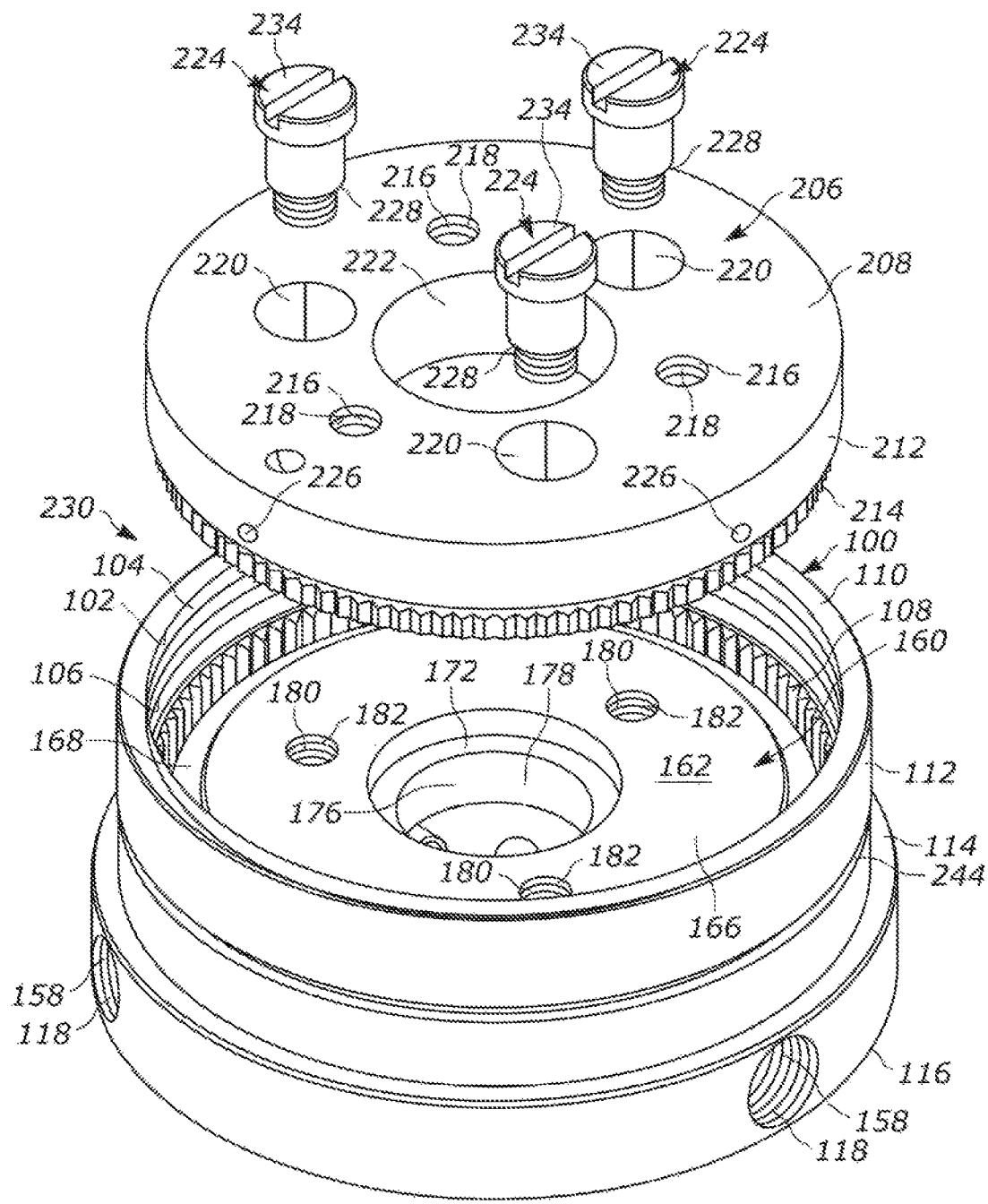
FIG. 18A is a top perspective exploded view of the turret chassis subassembly in accordance with embodiments of the disclosure.
Figure 18B:
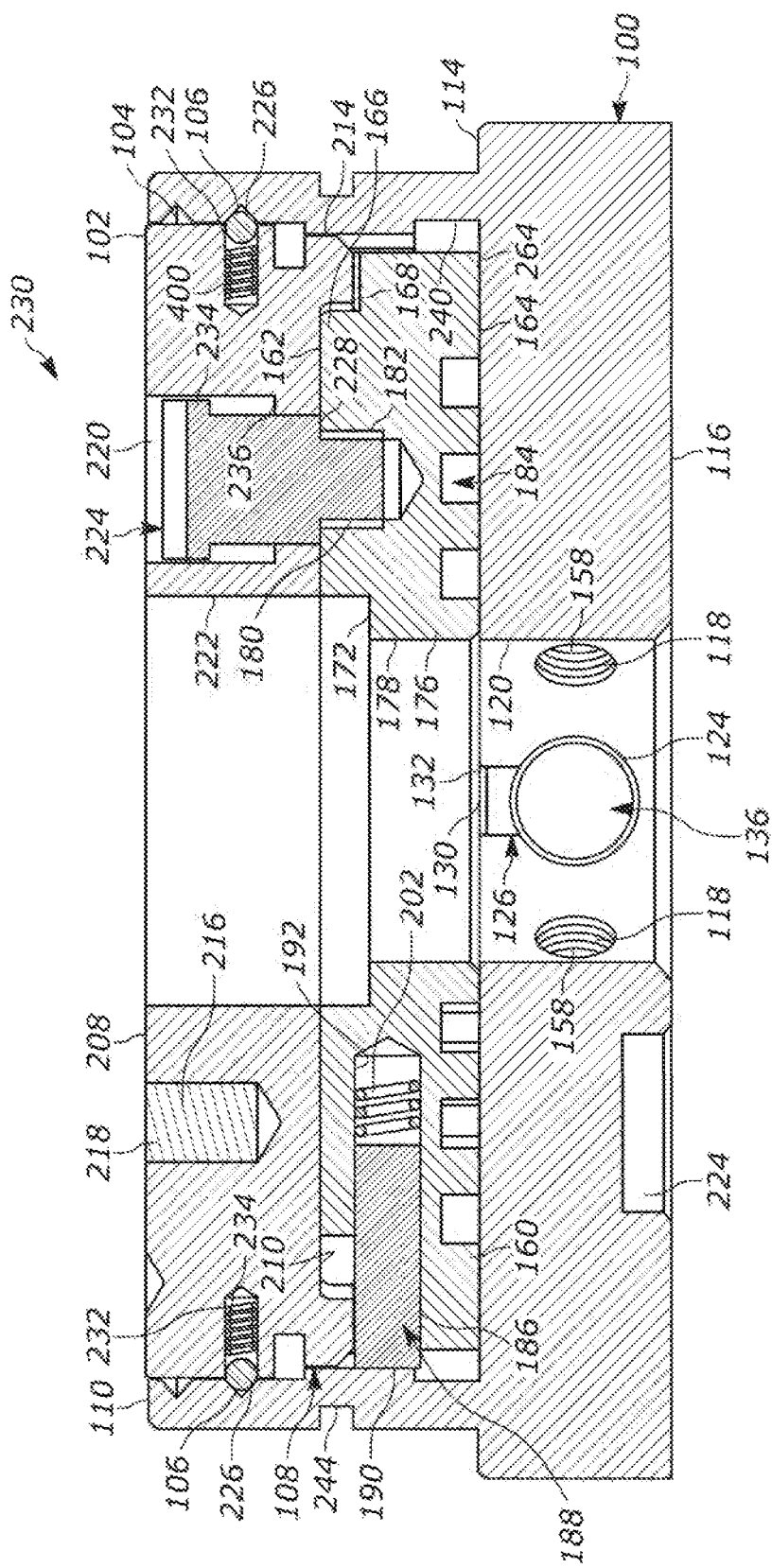
FIG. 18B is a side sectional view of the turret chassis subassembly in accordance with embodiments of the disclosure.

FIGS. 18A and 18B illustrate the complete turret chassis subassembly 230. The turret chassis subassembly 230 is assembled by inserting a locking gear 206 into the turret chassis 100 on top of the cam disc 160. The turret chassis subassembly 230 is shown in the locked position in FIG. 15B.

The locking gear 206 has a top 208 and a bottom 210. The top 208 defines three mount holes 216 with threads 218. The locking gear 206 also defines three smooth mount holes 220 and a central smooth bore 222. The bottom 210 of the locking gear 206 defines a toothed surface 214. The toothed surface 214 extends downward below the bottom 210 of the locking gear 206 to encircle the reduced radius portion 166 of the top 162 of the cam disc 160 when the chassis subassembly 230 is assembled. In the current embodiment, the toothed surface 214 has 100 teeth to mesh precisely with the 100 teeth of the toothed surface 108 on the interior perimeter 102 of the turret chassis 100 when the elevation turret 22 is locked.

Four ball bearings 226 protrude outwards from bores 232 in the exterior perimeter 212 located between the toothed surface and the top. Springs 400 located behind the ball bearings outwardly bias the ball bearings such that the ball bearings are biased to engage with the upper click groove 104 and lower click groove 106 on the interior perimeter 102 of the turret chassis 100. When the locking gear rises and towers as the turret 22 is unlocked and locked, the ball bearings 226 travel between the lower and upper click grooves 104, 106, thereby providing a vertical, resistant force and making a characteristic clicking sound.

When the turret chassis subassembly 230 is assembled, screws 224 are inserted into the mount holes 220 and protrude from the bottom 210 of the locking gear 206. The screws 224 are then screwed into the mount holes 180 in the top 162 of the cam disc 160 to mount the locking gear 206 to the cam disc 160. Subsequently, the locking gear 206 remains in a fixed rotational position with respect to the cam disc 160 when the turret 22 is unlocked and rotated. The heads 234 of the screws 224 are thinner than the depth of the mount holes 220 from the top 208 of the locking gear 206 to the shoulders 236. The screws 224 have shoulders 228 that contact the top 162 of the cam disc 160 when the screws are secured. As a result, the locking gear 206 is free to be raised until the heads 234 of the screws 224 contact the shoulders 236 and to be lowered until the bottom of the locking gear 206 contacts the top 162 of the cam disc 160. This vertical movement is sufficient for the toothed surface 214 of the locking gear 206 to be raised above the toothed surface 108 of the turret chassis 100, thereby enabling the elevation 22 turret to be unlocked and free to rotate.

Figure 19A:
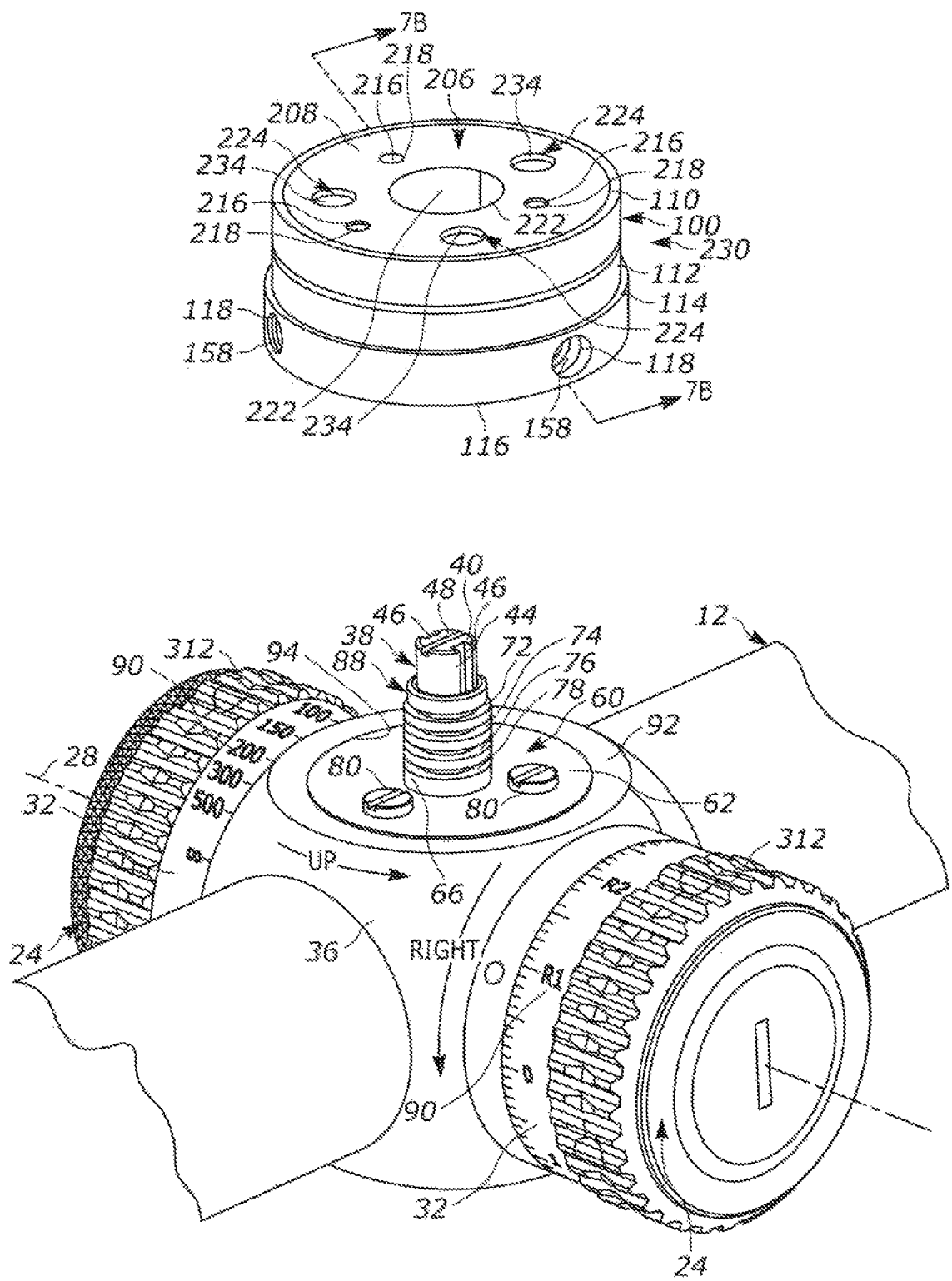
FIG. 19A is a top perspective exploded view of the turret chassis subassembly, turret screw subassembly and turret housing in accordance with embodiments of the disclosure.
Figure 19B:
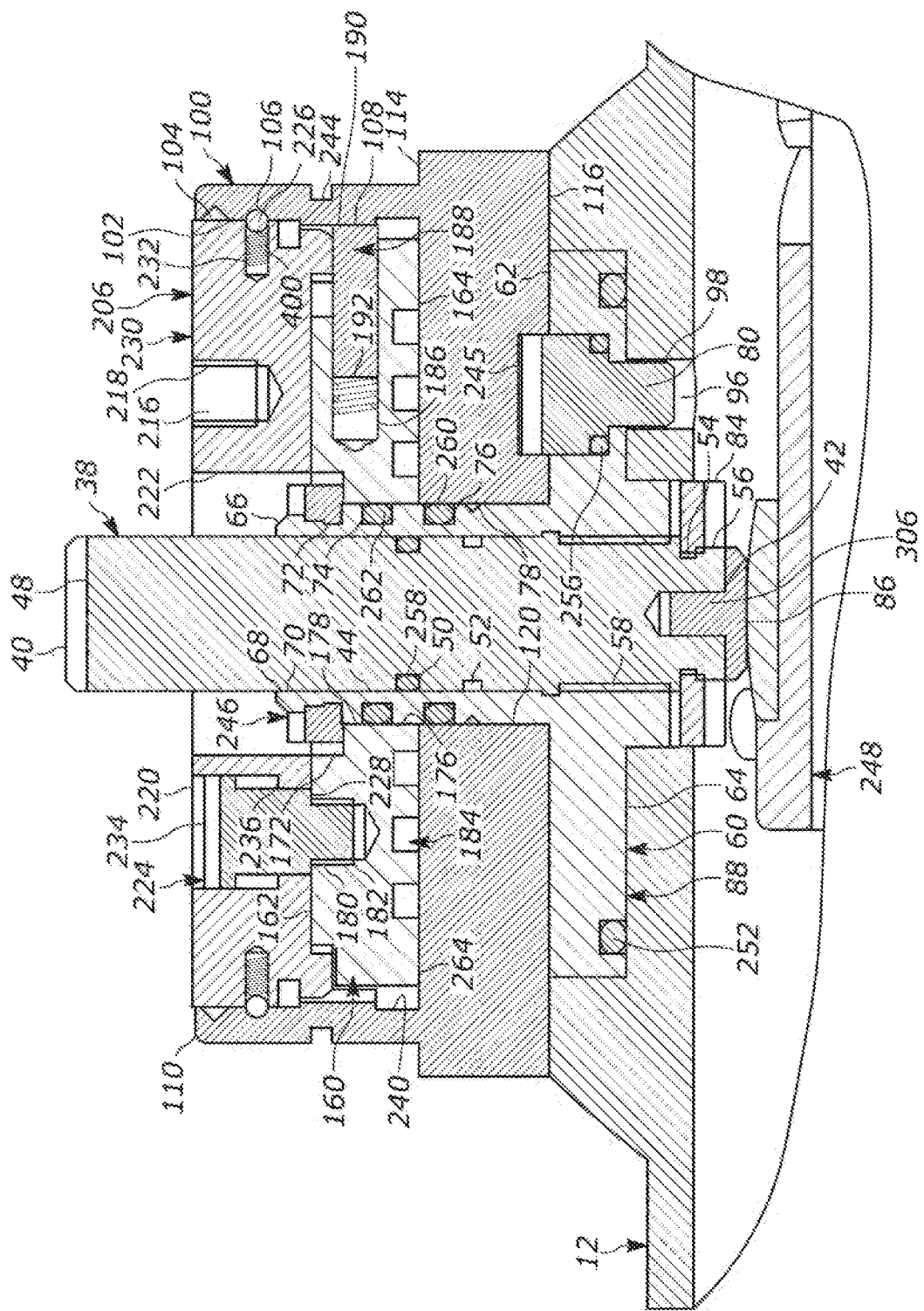
FIG. 19B is a side sectional view of the turret chassis subassembly, turret screw subassembly and turret housing in accordance with embodiments of the disclosure.

FIGS. 19A and 19B illustrate the turret chassis subassembly 230, screw subassembly 88, and turret housing 36. More particularly, the turret chassis subassembly 230 is shown assembled and in the process of being mounted on the turret screw subassembly 88 in FIG. 19A and mounted on the turret screw subassembly in FIG. 19B.

When the turret chassis subassembly 230 is mounted on the turret screw subassembly 88, the top 40 of the turret screw 38 and the collar 66 of the turret screw base 60 pass upwards through the smooth central bore 120 of the turret chassis 100, the smooth central bore 178 of the cam disc 160, and the smooth central bore 222 of the locking gear 206. A retaining ring 246 is received by the ring slot 72 in the collar 66 to prevent the turret chassis subassembly 230 from being lifted from the turret screw subassembly 88. Three recesses 245 in the bottom 116 of the turret chassis 100 receive the heads of the screws 80 that protrude from the top 62 of the turret screw base 60 so the bottom 116 of the turret chassis 100 can sit flush against the top 92 of the turret housing 36.

With the turret chassis subassembly 230 is described above with respect to a turret, which is an elevation turret, one of skill in the art will appreciate that similar designs may be used for turrets that make other adjustments, such as windage turrets. Further, the turret chassis subassembly 230 described above is described with respect to a zero point adjustment subassembly in accordance with embodiment 500. It will be appreciated that the turret chassis subassemblies 230 described herein can be implemented with any embodiment of the zero point adjustment subassembly 500, 500', 500'', 500''' or combination of embodiments described herein.

Various modifications and variations of the described compositions and methods of the invention will be apparent to those skilled in the art without departing from the scope and spirit of the invention. One skilled in the art will recognize at once that it would be possible to construct the present invention from a variety of materials and in a variety of different ways. Although the invention has been described in connection with specific preferred embodiments, it should be understood that the invention should not be unduly limited to such specific embodiments. While the preferred embodiments have been described in detail, and shown in the accompanying drawings, it will be evident that various further modification are possible without departing from the scope of the invention as set forth in the appended claims. Indeed, various modifications of the described modes for carrying out the invention which are obvious to those skilled in marksmanship or related fields are intended to be within the scope of the following claims.

What is claimed is:

1. A rifle scope comprising:
   a scope body;
   a movable optical element defining an optical axis connected to the scope body;
   a turret comprising
      (A) a turret screw defining a screw axis and operably connected to the optical element for adjusting the optical axis in response to rotation of the screw,
      (B) a turret chassis subassembly, and
      (C) a turret cap at least partially overlapping the turret chassis subassembly; and
   a zero point adjustment subassembly comprising
      (a) a zero cap connected to the turret screw, and
      (b) a locking mechanism releasably securing the zero cap and the turret,
   wherein the locking mechanism comprises a brake disc and a locking ring.

2. The rifle scope of claim 1, wherein the turret has an upper surface that defines a recess, and the zero cap, brake disc and lock ring are concentrically positioned in the recess.

3. The rifle scope of claim 2, wherein the locking mechanism further includes a lock ring lock button.

4. The rifle scope of claim 3, wherein the lock ring lock button is formed in the turret cap and comprises at least one spring-containing guide-rod.

5. The rifle scope of claim 1, wherein the turret chassis subassembly comprises:
   a spiral cam mechanism having a cam pin engaged thereto, the spiral cam mechanism defining a first stop surface and a second stop surface, each positioned for engagement by the stop element,
   wherein the first stop surface and send stop surface are connected by a channel which at least partially overlaps itself.

6. The rifle scope of claim 5 further comprising a rotation indicator connected to the stop element.

7. The rifle scope of claim 1, wherein the turret is an elevation turret.

8. A rifle scope comprising:
   a scope body;
   a movable optical element defining an optical axis connected to the scope body;
   a turret comprising
      (A) a turret screw defining a screw axis and operably connected to the optical element for adjusting the optical axis in response to rotation of the screw,
      (B) a turret chassis subassembly, and
      (C) a turret cap at least partially overlapping the turret chassis subassembly; and
   a zero point adjustment subassembly comprising
      (a) a zero cap connected to the turret screw, and
      (b) a locking mechanism releasably securing the zero cap and the turret, wherein the locking mechanism comprises a lock ring, a cam ring and a plurality of spring followers.

9. The rifle scope of claim 8, wherein the turret cap has an upper surface that defines a recess, and the zero cap, cam ring and lock ring are concentrically positioned in the recess.

10. The rifle scope of claim 9, wherein the plurality of spring followers are sandwiched between the zero cap and an upper surface of the recess.

11. A rifle scope comprising:
    a scope body;
    a movable optical element defining an optical axis connected to the scope body;
    a turret comprising (A) a turret screw defining a screw axis and operably connected to the optical element for adjusting the optical axis in response to rotation of the screw,
(B) a turret chassis subassembly, and
(C) a turret cap at least partially overlapping the turret chassis subassembly; and a zero point adjustment subassembly comprising
(a) a zero cap connected to the turret screw, and
(b) a locking mechanism releasably securing the zero cap and the turret, wherein the locking mechanism comprises a lever, a conical wedge, and a collet.

12. The rifle scope of claim 11, wherein the lever is connected to the turret screw.

13. The rifle scope of claim 12, wherein the conical wedge is positioned around the turret screw.

14. The rifle scope of claim 13, wherein the turret cap has an upper surface that defines a recess, and the zero cap is positioned in the recess.

15. The rifle scope of claim 14, wherein the zero cap has a central opening through which the lever connects to the turret screw.

16. The rifle scope of claim 15, wherein the collet is sandwiched between the zero cap and an upper surface of the recess.

* * * * *